United States Patent
Kishore et al.

(10) Patent No.: US 12,033,233 B2
(45) Date of Patent: Jul. 9, 2024

(54) IMAGE STEGANOGRAPHY UTILIZING ADVERSARIAL PERTURBATIONS

(71) Applicant: Cornell University, Ithaca, NY (US)

(72) Inventors: Varsha Kishore, Ithaca, NY (US);
Kilian Weinberger, Ithaca, NY (US);
Xiangyu Chen, Ithaca, NY (US); Boyi Li, New York, NY (US); Yan Wang, Ithaca, NY (US); Ruihan Wu, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 18/557,361

(22) PCT Filed: May 16, 2022

(86) PCT No.: PCT/US2022/029410
§ 371 (c)(1),
(2) Date: Oct. 26, 2023

(87) PCT Pub. No.: WO2022/241307
PCT Pub. Date: Nov. 17, 2022

(65) Prior Publication Data
US 2024/0104681 A1 Mar. 28, 2024

Related U.S. Application Data

(60) Provisional application No. 63/188,822, filed on May 14, 2021.

(51) Int. Cl.
*G06T 1/00* (2006.01)
*G06N 3/0442* (2023.01)
(Continued)

(52) U.S. Cl.
CPC ........... *G06T 1/005* (2013.01); *G06N 3/0442* (2023.01); *G06N 3/0455* (2023.01); *G06V 40/16* (2022.01)

(58) Field of Classification Search
CPC .... G06T 1/005; G06N 3/0442; G06N 3/0455; G06V 40/16
See application file for complete search history.

(56) References Cited

U.S. PATENT DOCUMENTS

2008/0226068 A1  9/2008 Dufaux et al.
2017/0301121 A1  10/2017 Whitehill et al.
(Continued)

FOREIGN PATENT DOCUMENTS

CN   111242837 A   6/2020
EP     3451209 A1   3/2019
(Continued)

OTHER PUBLICATIONS

S. Gu et al., "Towards Deep Neural Network Architectures Robust to Adversarial Examples," arXiv:1412.5068v4, Apr. 9, 2015, 9 pages.
(Continued)

*Primary Examiner* — John W Lee
(74) *Attorney, Agent, or Firm* — Ryan, Mason & Lewis, LLP

(57) ABSTRACT

A method performed by at least one processing device in an illustrative embodiment comprises applying a first image and a message to an encoder of a steganographic encoder-decoder neural network, generating in the encoder, based at least in part on the first image and the message, a perturbed image containing the message, decoding the perturbed image in a decoder of the steganographic encoder-decoder neural network, and providing information characterizing the decoded perturbed image to the encoder. The generating, decoding and providing are iteratively repeated, with different perturbations being determined in the encoder as a function of respective different instances of the provided information, until the decoded perturbed image meets one or more specified criteria relative to the message. The per-
(Continued)

turbed image corresponding to the decoded perturbed image that meets the one or more specified criteria relative to the message is output as a steganographic image containing the message.

30 Claims, 11 Drawing Sheets

(51) Int. Cl.
    *G06N 3/0455* (2023.01)
    *G06V 40/16* (2022.01)

(56) References Cited

U.S. PATENT DOCUMENTS

| | | | |
|---|---|---|---|
| 2019/0123911 A1 | 4/2019 | Riley | |
| 2019/0347755 A1 | 11/2019 | Lyons et al. | |
| 2020/0184592 A1* | 6/2020 | Baluja | G06T 1/0021 |
| 2021/0034717 A1 | 2/2021 | Cardonha et al. | |
| 2021/0374501 A1* | 12/2021 | Zhang | G06N 3/082 |
| 2022/0092721 A1* | 3/2022 | He | G06T 1/005 |

FOREIGN PATENT DOCUMENTS

| | | | |
|---|---|---|---|
| WO | 2020207738 A1 | 10/2020 | |
| WO | 2020260869 A1 | 12/2020 | |
| WO | 2021033183 A1 | 2/2021 | |
| WO | 2021047482 A1 | 3/2021 | |

OTHER PUBLICATIONS

C. Guo et al., "Countering Adversarial Images Using Input Transformations," arXiv:1711.00117v3, Jan. 25, 2018, 12 pages.
C. Guo et al., "Simple Black-Box Adversarial Attacks," Proceedings of the 36th International Conference on Machine Learning, Jun. 2019, 10 pages.
C. Guo et al., "Low Frequency Adversarial Perturbation," arXiv:1809.08758v2, Jul. 22, 2019, 11 pages.
S. Gupta et al., "Information Hiding Using Least Significant Bit Steganography and Cryptography," International Journal of Modern Education and Computer Science, vol. 6, Jun. 2012, pp. 27-34.
V. Holub et al., "Designing Steganographic Distortion Using Directional Filters," 2012 IEEE International Workshop on Information Forensics and Security, Dec. 2012, 6 pages.
V. Holub et al., "Universal Distortion Function for Steganography in an Arbitrary Domain," EURASIP Journal on Information Security, Jan. 3, 2014, 13 pages.
T. Yu et al., "A New Defense Against Adversarial Images: Turning a Weakness into a Strength," Proceedings of the 33rd International Conference on Neural Information Processing Systems, Dec. 2019, 12 pages.
H. Hukkelas et al., "DeepPrivacy: A Generative Adversarial Network for Face Anonymization." arXiv:1909.04538v1, Sep. 10, 2019, 14 pages.
P. Isola et al., "Image-to-Image Translation with Conditional Adversarial Networks," IEEE Conference on Computer Vision and Pattern Recognition (CVPR), Jul. 2017, pp. 1125-1134.
J. Jing et al., "Hinet: Deep Image Hiding by Invertible Network," IEEE/CVF International Conference on Computer Vision (ICCV), Oct. 2021, pp. 4733-4742.
A. Kurakin et al., "Adversarial Machine Learning at Scale," arXiv:1611.01236v2, Feb. 11, 2017, 17 pages.
A. Kurakin et al., "Adversarial Examples in the Physical World," arXiv:1607.02533v4, Feb. 11, 2017, 14 pages.
D. Lerch-Hostalot, "Aletheia," https://zenodo.org/record/4655945, Apr. 1, 2021, 4 pages.
B. Li et al., "Positional Normalization," Proceedings of the 33rd International Conference on Neural Information Processing Systems, Dec. 2019, 13 pages.

X. Li et al., "Adversarial Examples Detection in Deep Networks with Convolutional Filter Statistics," IEEE International Conference on Computer Vision (ICCV), Oct. 2017, pp. 5764-5772.
T.-Y. Lin et al., "Microsoft COCO: Common Objects in Context," arXiv:1405.0312v3, Feb. 21, 2015, 15 pages.
Y. Liu et al., "Delving into Transferable Adversarial Examples and Black-Box Attacks," arXiv:1611.02770v3, Feb. 7, 2017, 24 pages.
Z. Liu et al., "Deep Learning Face Attributes in the Wild," IEEE International Conference on Computer Vision (ICCV), Dec. 2015, pp. 3730-3738.
J. Lu et al., "SafetyNet: Detecting and Rejecting Adversarial Examples," IEEE International Conference on Computer Vision (ICCV), Oct. 2017, pp. 446-454.
J. Lu et al., "No Need to Worry about Adversarial Examples in Object Detection in Autonomous Vehicles," arXiv:1707.03501v1, Jul. 12, 2017, 9 pages.
S.-P. Lu et al., "Large-Capacity Image Steganography Based on Invertible Neural Networks," IEEE/CVF Conference on Computer Vision and Pattern Recognition (CVPR), Jun. 2021, pp. 10816-10825.
A. Madry et al., "Towards Deep Learning Models Resistant to Adversarial Attacks," arXiv:1706.06083v4, Sep. 4, 2019, 28 pages.
D. Meng et al., "MagNet: A Two-Pronged Defense against Adversarial Examples," arXiv:1705.09064v2, Sep. 11, 2017, 13 pages.
T. Miyato et al., "Distributional Smoothing with Virtual Adversarial Training," arXiv:1507.00677v9, Jun. 11, 2016, 12 pages.
S.-M. Moosavi-Dezfooli et al., "DeepFool: A Simple and Accurate Method to Fool Deep Neural Networks," IEEE Conference on Computer Vision and Pattern Recognition (CVPR), Jun. 2016, pp. 2574-2582.
S.-M. Moosavi-Dezfooli et al., "Universal Adversarial Perturbations," IEEE Conference on Computer Vision and Pattern Recognition (CVPR), Jul. 2017, pp. 1765-1773.
T. Morkel et al., "An Overview of Image Steganography," Proceedings of the Fifth Annual Information Security South Africa Conference, Jun.-Jul. 2005, 12 pages.
C. Neustaedter et al., "Blur Filtration Fails to Preserve Privacy for Home-Based Video Conferencing," ACM Transactions on Computer-Human Interaction, vol. 13, No. 1, Mar. 2006, pp. 1-36.
A. Nokland, "Improving Back-Propagation by Adding an Adversarial Gradient," arXiv:1510.04189v2, Apr. 6, 2016, 8 pages.
N. Papernot et al., "Distillation as a Defense to Adversarial Perturbations against Deep Neural Networks," IEEE Symposium on Security & Privacy, arXiv:1511.04508v2, Mar. 14, 2016, 16 pages.
N. Papernot et al., "Practical Black-Box Attacks against Machine Learning," Proceedings of the 2017 ACM on Asia Conference on Computer and Communications Security, Apr. 2017, pp. 506-519.
T. Pevny et al., "Using High-Dimensional Image Models to Perform Highly Undetectable Steganography," International Workshop on Information Hiding, Jun. 2010, 17 pages.
J. Qin et al., "A Review on Detection of LSB Matching Steganography," Information Technology Journal, vol. 9, No. 8, Sep. 2010, pp. 1725-1738.
A. Ur Rehman et al., "End-to-End Trained CNN Encoder-Decoder Networks for Image Steganography," arXiv:1711.07201v1, Nov. 20, 2017, 5 pages.
A. Shafahi et al., "Are Adversarial Examples Inevitable?" arXiv:1809.02104v3, Feb. 3, 2020, 17 pages.
Y. Srinivasan et al., "Secure Transmission of Medical Records Using High Capacity Steganography," 17th IEEE Symposium on Computer-Based Medical Systems, Jun. 2004, 6 pages.
Nist, "Advanced Encryption Standard (AES)," Federal Information Processing Standards Publication 197, Nov. 26, 2001, 51 pages.
J. Su et al., "One Pixel Attack for Fooling Deep Neural Networks," arXiv:1710.08864v7, Oct. 17, 2019, 15 pages.
C. Szegedy et al., "Intriguing Properties of Neural Networks," arXiv:1312.6199v4, Feb. 19, 2014, 10 pages.
M. Tancik et al., "Stegastamp: Invisible Hyperlinks in Physical Photographs," arXiv:1904.05343v2, Mar. 26, 2020, 13 pages.
W. Tang et al., "CNN-Based Adversarial Embedding for Image Steganography," IEEE Transactions on Information Forensics and Security, vol. 14, No. 8, Aug. 2019, pp. 2074-2087.
F. Tramer et al., "Ensemble Adversarial Training: Attacks and Defenses," arXiv:1705.07204v5, Apr. 26, 2020, 22 pages.

(56) References Cited

OTHER PUBLICATIONS

D. Ulyanov et al., "Instance Normalization: The Missing Ingredient for Fast Stylization," arXiv:1607.08022v3, Nov. 6, 2017, 6 pages.
R. G. Van Schyndel et al., "A Digital Watermark," Proceedings of 1st International Conference on Image Processing, Nov. 1994, pp. 86-90.
G. K. Wallace, "The JPEG Still Picture Compression Standard," Communications of the ACM, vol. 34, No. 4, Apr. 1991, pp. 31-44.
E. Wengrowski et al., "Light Field Messaging with Deep Photographic Steganography," IEEE/CVF Conference on Computer Vision and Pattern Recognition (CVPR), Jun. 2019, pp. 1515-1524.
A. Westfeld et al., "Attacks on Steganographic Systems," International Workshop on Information Hiding, Oct. 1999, 16 pages.
R. B. Wolfgang et al., "A Watermark for Digital Images," Proceedings of 3rd IEEE International Conference on Image Processing, Sep. 1996, 4 pages.
B. Wu et al., "Do Wider Neural Networks Really Help Adversarial Robustness?" Thirty-Fifth Conference on Neural Information Processing Systems, Dec. 2021, 14 pages.
P. Wu et al., "StegNet: Mega Image Steganography Capacity with Deep Convolutional Network," Future Internet, vol. 10, No. 6, Jun. 15, 2018, 15 pages.
H. Xu et al., "Adversarial Attacks and Defenses in Images, Graphs and Text: A Review," International Journal of Automation and Computing, vol. 17, No. 2, Apr. 2020, pp. 151-178.
W. Xu et al., "Feature Squeezing: Detecting Adversarial Examples in Deep Neural Networks," Network and Distributed Systems Security Symposium, arXiv:1704.01155v2, Dec. 5, 2017, 15 pages.
J. Ye et al., "Deep Learning Hierarchical Representations for Image Steganalysis," IEEE Transactions on Information Forensics and Security, vol. 12, No. 11, Nov. 2017, pp. 2545-2557.
C. Yu et al., "Attention Based Data Hiding with Generative Adversarial Networks," The Thirty-Fourth AAAI Conference on Artificial Intelligence, vol. 34 No. 01, Apr. 3, 2020, pp. 1120-1128.
X. Yuan et al., "Adversarial Examples: Attacks and Defenses for Deep Learning," IEEE Transactions on Neural Networks and Learning Systems, vol. 30, No. 9, Sep. 2019, pp. 2805-2824.
C. Zhang et al., "UDH: Universal Deep Hiding for Steganography, Watermarking, and Light Field Messaging," 34th Conference on Neural Information Processing Systems, Dec. 2020, 12 pages.
J. Zhang et al., "ModelWatermarking for Image Processing Networks," arXiv:2002.11088v1, Feb. 25, 2020, 9 pages.
K. A. Zhang et al., "SteganoGAN: High Capacity Image Steganography with GANs," arXiv:1901.03892v2, Jan. 30, 2019, 11 pages.
R. Zhang et al., "Invisible Steganography via Generative Adversarial Networks," arXiv:1807.08571v3, Oct. 10, 2018, 12 pages.
J. Zhu et al., "Hidden: Hiding Data With Deep Networks," arXiv:1807.09937v1, Jul. 26, 2018, 22 pages.
I. J. Cox et al., "Digital Watermarking and Steganography," Elsevier Inc., Second Edition, Nov. 13, 2007, 567 pages.
C.-S. Lu et al., "Multimedia Security: Steganography and Digital Watermarking Techniques for Protection of Intellectual Property," IDEA Group Publishing, Jul. 2004, 270 pages.
K. Gregor et al., "Learning Fast Approximations of Sparse Coding," Proceedings of the 27th International Confer-ence on Machine Learning, Jun. 21, 2010, 8 pages.
I. Bilal et al., "Recent Advancement in Audio Steganography," 2014 International Conference on Parallel, Distributed and Grid Computing, Dec. 2014, pp. 402-405.
Y. Qian et al., "Learning and Transferring Representations for Image Steganalysis Using Convolutional Neural Network," 2016 IEEE International Conference on Image Processing (ICIP), Sep. 2016, pp. 2752-2756.
Y. Qian et al., "Feature Learning for Steganalysis Using Convolutional Neural Networks," Multimedia Tools and Applications, vol. 77, Nov. 20, 2017, pp. 19633-19657.
H.-J. Kim et al., "Digital Watermarking," 7th International Workshop, IWDW, Nov. 2008, Springer, 481 pages.
E. Becker et al., "Digital Rights Management: Technological, Economic, Legal and Political Aspects," Lecture Notes in Computer Science, Sep. 2003, Springer, 842 pages.
L. Li et al., "AdvSGAN: Adversarial Image Steganography with Adversarial Networks," Multimedia Tools and Applications, vol. 80, Apr. 18, 2021, pp. 25539-25555.
W. You et al., "A Siamese CNN for Image Steganalysis," IEEE Transactions on Information Forensics and Security, vol. 16, Jul. 2020, pp. 291-306.
T. Zhang et al., "Reliable Detection of LSB Steganography Based on the Difference Image Histogram," IEEE International Conference on Acoustics, Speech, and Signal Processing, Apr. 2003, pp. 545-548.
R. Fletcher, "Practical Methods of Optimization," 2nd Edition, John Wiley & Sons, Jun. 2008, Preface Only.
Y. Qian et al., "Deep Learning for Steganalysis via Convolutional Neural Networks," Media Watermarking, Security, and Forensics, vol. 9409, Mar. 4, 2015, Abstract Only.
Z. Ren et al., "Learning to Anonymize Faces for Privacy Preserving Action Detection," Proceedings of the European Conference on Computer Vision (ECCV), Aug. 2020, 17 pages.
International Search Report of PCT/US2022/029410, dated Sep. 21, 2022, 15 pages.
J. Hayes et al., "Generating Steganographic Images via Adversarial Training," arXiv:1703.00371v3, Jul. 24, 2017, 9 pages.
D. Shu et al., "Encrypted Rich-data Steganography using Generative Adversarial Networks," ACM Workshop on Wireless Security and Machine Learning, Jul. 2020, pp. 55-60.
Y. Li et al., "Generative Face Completion," IEEE Conference on Computer Vision and Pattern Recognition, Jul. 2017, pp. 3911-3919.
R. Gross et al., "Model-Based Face Deidentification," Conference on Computer Vision and Pattern Recognition Workshop, Jun. 2006, 8 pages.
K. Zhang et al., "Joint Face Detection and Alignment Using Multitask Cascaded Convolutional Networks," IEEE Signal Processing Letters, vol. 23, No. 10, Oct. 2016, pp. 1499-1503.
J. Li et al., "DSFD: Dual Shot Face Detector," IEEE/CVF Conference on Computer Vision and Pattern Recognition, Jun. 2019, pp. 5060-5069.
K. He et al., "Mask R-CNN," IEEE International Conference on Computer Vision, Oct. 2017, pp. 2961-2969.
A. Karnewar et al., "MSG-GAN: Multi-Scale Gradients for Generative Adversarial Networks," Computer Vision and Pattern Recognition, Jun. 2020, pp. 7799-7808.
R. Shin et al., "Jpeg-resistant Adversarial Images," NIPS 2017 Workshop on Machine Learning and Computer Security, Dec. 2017, 6 pages.
N. Carlini et al., "Towards Evaluating the Robustness of Neural Networks," arXiv:1608.04644v2, Mar. 22, 2017, 19 pages.
J. Adler et al., "Learned Primal-dual Reconstruction," arXiv:1707.06474v3, Jul. 5, 2018, 11 pages.
A. Agrawal et al., "Differentiable Convex Optimization Layers," 33rd Conference on Neural Information Processing Systems, Dec. 2019, 13 pages.
M. Boroumand et al., "Deep Residual Network for Steganalysis of Digital Images," IEEE Transactions on Information Forensics and Security, vol. 14, No. 5, May 2019, pp. 1181-1193.
C.-K. Chan et al., "Hiding Data in Images by Simple LSB Substitution," Pattern Recognition, vol. 37, No. 3, Mar. 2004, pp. 469-474.
M. Chen et al., "JPEG-Phase-Aware Convolutional Neural Network for Steganalysis of JPEG Images," Proceedings of the 5th ACM Workshop on Information Hiding and Multimedia Security, June 201, pp. 75-84.
J. Flynn et al., "DeepView: View Synthesis with Learned Gradient Descent," Proceedings of the IEEE/CVF Conference on Computer Vision and Pattern Recognition, Jun. 2019, pp. 2367-2376.
D. C. Liu et al., "On the Limited Memory BFGS Method For Large Scale Optimization," Mathematical Programming, vol. 45, Aug. 1989, 26 pages.
Z. Liu et al., "Large-scale CelebFaces Attributes (CelebA) Dataset," https://mmlab.ie.cuhk.edu.hk/projects/CelebA.html, Accessed Jun. 2, 2023, 9 pages.

(56) References Cited

OTHER PUBLICATIONS

Y. Shang et al., "Enhancing The Security Of Deep Learning Steganography via Adversarial Examples," Mathematics, vol. 8, No. 9, Aug. 28, 2020, 10 pages.
Z. Teed et al., "RAFT: Recurrent All-Pairs Field Transforms for Optical Flow," arXiv:2003.12039v3, Aug. 25, 2020, 21 pages.
P.-W. Wang et al., "SATNet: Bridging Deep Learning And Logical Reasoning Using A Differentiable Satisfiability Solver," International Conference on Machine Learning, May 24, 2019, 10 pages.
Z. Wang et al., "Image Quality Assessment: From Error Visibility to Structural Similarity," IEEE Transactions on Image Processing, vol. 13, No. 4, Apr. 2004, 14 pages.
D.-C. Wu et al., "A Steganographic Method For Images By Pixel-Value Differencing," Pattern Recognition Letters, vol. 24, No. 9-10, Jun. 2003, pp. 1613-1626.
S. Wu et al., "A Novel Convolutional Neural Network for Image Steganalysis with Shared Normalization," arXiv:1711.07306v2, Nov. 21, 2017, 12 pages.
G. Xu, "Deep Convolutional Neural Network to Detect J-UNIWARD," Proceedings of the 5th ACM Workshop on Information Hiding and Multimedia Security, Jun. 2017, 6 pages.
E. Agustsson et al., "NTIRE 2017 Challenge on Single Image Super-Resolution: Dataset and Study," Proceedings of the IEEE Conference on Computer Vision and Pattern Recognition Workshops, Jul. 2017, pp. 126-135.
A. Athalye et al., "Obfuscated Gradients Give a False Sense of Security: Circumventing Defenses to Adversarial Examples," Proceedings of the 35th International Conference on Machine Learning, Jul. 2018, 10 pages.
A. Athalye et al., "Synthesizing Robust Adversarial Examples," Proceedings of the 35th International Conference on Machine Learning, Jul. 2018, 10 pages.
S. Baluja, "Hiding Images in Plain Sight: Deep Steganography," 31st Conference on Neural Information Processing Systems, Dec. 2017, 11 pages.
S. Bernard et al., "Optimizing Additive Approximations of Non-Additive Distortion Functions," Proceedings of the 2021 ACM Workshop on Information Hiding and Multimedia Security, Jun. 2021, 8 pages.
B. Biggio et al., "Evasion Attacks Against Machine Learning at Test Time," arXiv:1708.06131v1, Aug. 21, 2017, 16 pages.
B. Boehm et al., "StegExpose—A Tool for Detecting LSB Steganography," arXiv:1410.6656v1, Oct. 24, 2014, 11 pages.
R. Bohme et al., "Exploiting Preserved Statistics for Steganalysis," International Workshop on Information Hiding, May 2004, pp. 82-96.
M. Boyle et al., "The Effects of Filtered Video on Awareness and Privacy," Proceedings of The 2000 ACM Conference on Computer Supported Cooperative Work, Dec. 2000.
N. Carlini et al., "Defensive Distillation is Not Robust to Adversarial Examples," arXiv:1607.04311v1, Jul. 14, 2016, 3 pages.
N. Carlini et al., "Adversarial Examples Are Not Easily Detected: Bypassing Ten Detection Methods," Proceedings of the 10th ACM Workshop on Artificial Intelligence and Security, Nov. 2017, pp. 3-14.
M. Cisse et al., "Parseval Networks: Improving Robustness to Adversarial Examples," Proceedings of the 34th International Conference on Machine Learning, Aug. 2017, 10 pages.
G. De Palma et al., "Adversarial Robustness Guarantees for Random Deep Neural Networks," International Conference on Machine Learning, Jul. 2021, 13 pages.
S. Dong et al., "Invisible Steganography via Generative Adversarial Networks," arXiv:1807.08571v3, Oct. 10, 2018, 12 pages.
S. Dumitrescu et al., "On Steganalysis of Random LSB Embedding in Continuous-tone Images," International Conference on Image Processing, Sep. 2002, 4 pages.
S. Dumitrescu et al., "Detection of LSB Steganography via Sample Pair Analysis," International Workshop on Information Hiding, Oct. 2002, 27 pages.
G. K. Dziugaite et al., "A Study of the Effect of JPG Compression on Adversarial Images," arXiv:1608.00853v1, Aug. 2, 2016, 8 pages.
J. Fridrich et al., "Detecting LSB Steganography in Color, and Gray-Scale Images," IEEE MultiMedia, vol. 8, No. 4, Oct.-Dec. 2001, pp. 22-28.
S. Ghamizi et al., "Adversarial Embedding: A Robust and Elusive Steganography and Watermarking Technique," arXiv:1912.01487v1, Nov. 14, 2019, 13 pages.
A. Ghiasi et al., "Breaking Certified Defenses: Semantic Adversarial Examples with Spoofed Robustness Certificates," arXiv:2003.08937v1, Mar. 19, 2020, 16 pages.
I. Goodfellow et al., "Deep Learning," MIT Press, 2016, 802 pages.
I. J. Goodfellow et al., "Explaining and Harnessing Adversarial Examples," arXiv:1412.6572v3, Mar. 20, 2015, 11 pages.
A. Graese et al., "Assessing Threat of Adversarial Examples on Deep Neural Networks," arXiv:1610.04256v1, Oct. 13, 2016, 6 pages.

\* cited by examiner

Algorithm 1 Adversarial Attack for Message hiding

1: Inputs: decoder network $F$, cover image $X$, secret message $M$
2: Hyper-parameters: learning rate $\alpha > 0$, perturbation bound $\epsilon > 0$, optimization steps $n > 0$, max L-BFGS iterations $k > 0$
3: $\tilde{X} \leftarrow X$
4: for $n$ iterations do
5: $\quad \tilde{X} = LBFGS(F(\tilde{X}), M, L_{BCE}, k)$ ▷ Take $k$ steps to optimize $L_{BCE}(F(\tilde{X}), M)$
6: $\quad \delta \leftarrow clip_{-\epsilon}^{\epsilon}(\tilde{X} - X)$ ▷ Clip pixel value changes exceeding $\pm \epsilon$
7: $\quad \tilde{X} \leftarrow clip_0^1(X + \delta)$ ▷ Clip pixel values to $[0, 1]$
8: return $\tilde{X}$

FIG. 3

ITERATIVE OPTIMIZATION ALGORITHM $\delta_0 \leftarrow 0;$
for $t=1$ to $T$ do
$\quad \delta_t \leftarrow \delta_{t-1} + \eta \cdot g\left(\nabla_{\delta_{t-1}} \ell(X + \delta_{t-1}, M), X, \delta_{t-1}\right);$
$\tilde{X} \leftarrow X + \delta_T;$
return $\tilde{X};$

FIG. 4

IMAGE STEGANOGRAPHY UTILIZING ADVERSARIAL PERTURBATIONS

RELATED APPLICATION

The present application claims priority to U.S. Provisional Patent Application Serial No. 63/188,822, filed May 14, 2021, which is incorporated by reference herein in its entirety.

STATEMENT OF GOVERNMENT SUPPORT

This invention was made with U.S. government support under Grant No. HR00112090091 of the Defense Advanced Research Projects Agency (DARPA). The U.S. government has certain rights in the invention.

FIELD

The field relates generally to information processing systems, and more particularly to information security techniques implemented in such systems.

BACKGROUND

Image steganography aims to hide a secret message within an image, illustratively through minimal alterations, such that only intended recipients are aware of the hidden secret message. Image steganography has been widely used in applications such as watermarking, copyright certification and private information storage. Classic steganography tools use pixel statistics to hide information in images, but are unduly limited in terms of the number of bits per pixel that can be hidden within the image. Other known techniques can store more bits per pixel, but suffer from high error rates in the recovered secret message. A need therefore exists for techniques that can not only insert substantial amounts of hidden data within a given image, but also support low error rates for the recovered secret message.

SUMMARY

Illustrative embodiments disclosed herein provide improved techniques for image steganography. For example, in some embodiments, the disclosed techniques utilize adversarial perturbations to accurately and efficiently incorporate a secret message into a given image, in a manner that can provide an advantageous combination of both high information storage per image pixel and low message recovery error rate, relative to conventional approaches. These and other arrangements disclosed herein are particularly advantageous in numerous applications that have low error rate requirements for the recovered secret message. For example, in some applications, the secret message includes no redundancy for error correction, and there is zero tolerance for even a single incorrectly recovered bit. This includes certain applications in which the secret message is encrypted, as the encrypted message comprises a random bit string that must be recovered with zero error for successful decryption. Some embodiments herein can provide zero error recovery of the secret message, thereby facilitating the utilization of encrypted messages in image steganography. Similar advantages are provided for the utilization of compressed messages in image steganography.

In one embodiment, a method performed by at least one processing device comprises applying a first image and a message to an encoder of a steganographic encoder-decoder neural network, generating in the encoder, based at least in part on the first image and the message, a perturbed image containing the message, decoding the perturbed image in a decoder of the steganographic encoder-decoder neural network, and providing information characterizing the decoded perturbed image to the encoder. The generating, decoding and providing are iteratively repeated, with different perturbations being determined in the encoder as a function of respective different instances of the provided information, until the decoded perturbed image meets one or more specified criteria relative to the message. The perturbed image corresponding to the decoded perturbed image that meets the one or more specified criteria relative to the message is output as a steganographic image containing the message.

In some embodiments, the one or more specified criteria relative to the message include that the decoded perturbed image is identical to the message, although additional or alternative criteria can be used.

Image steganography techniques as disclosed herein can be utilized in a wide variety of different applications.

For example, some embodiments disclosed herein provide users of social media, messaging services, or other Internet platforms with a safe and secure mechanism by which to share images. This mechanism advantageously protects such users against the dangers that compromising images may "go viral" or leak to online platforms with potentially damaging consequences to particular individuals shown in the images.

In one or more embodiments, an altered image is generated, in which the original face is replaced with a "fake" face and the original face is encrypted and hidden within the altered image. The disclosed techniques are illustratively configured to allow a trusted individual or other trusted entity to extract the original face, decrypt it and insert it back into the altered image to obtain the private image. The fake face is generated without any knowledge of the original face, and therefore cannot possibly be used to reconstruct the original face information.

In some embodiments of this type, the above-noted method performed by at least one processing device illustratively further comprises detecting a face in an original image, generating the first image from the original image by modifying the original image to replace the detected face with a replacement face, and generating the message to comprise an encrypted version of the detected face.

For example, generating the message to comprise an encrypted version of the detected face illustratively comprises extracting pixel information of the detected face from the original image, encoding the pixel information, and encrypting the encoded pixel information to form at least a portion of the message.

Such a method may additionally or alternatively comprise extracting the message from the steganographic image to obtain the first image, obtaining the encrypted version of the detected face from the message, obtaining a decryption key for the encrypted version of the detected face, decrypting the encrypted version of the detected face using the obtained decryption key to recover the detected face, and restoring the original image by replacing the replacement face of the first image with the detected face.

Numerous other arrangements for identity protecting image sharing can be used in other embodiments.

Also, the disclosed image steganography techniques are more broadly applicable to a wide variety of other image security applications, and to other image processing applications in which it is desirable to hide messages in images.

For example, some embodiments disclosed herein do not involve detection or replacement of faces in images, and can more generally provide privacy protections for images that do not include any faces at all. In one embodiment of this type, a user could hide a message image, for which privacy protection is desired, in a benign cover image. The user can then provide only one or more authorized users with the appropriate permissions to view that hidden message image, while all other users would see only the benign cover image, and would be unable to extract the hidden message image.

Again, it should be understood that the foregoing arrangements are only examples, and numerous alternative arrangements are possible.

These and other illustrative embodiments include but are not limited to systems, methods, apparatus, processing devices, integrated circuits, and computer program products comprising processor-readable storage media having software program code embodied therein.

BRIEF DESCRIPTION OF THE FIGURES

FIG. 3 shows an example algorithm for image steganography utilizing adversarial perturbations, and more particularly utilizing an adversarial attack technique for message hiding, in an illustrative embodiment.

FIG. 4 shows an example algorithm for iterative optimization in image steganography utilizing adversarial perturbations in an illustrative embodiment.

DETAILED DESCRIPTION

Illustrative embodiments can be implemented, for example, in the form of information processing systems comprising one or more processing platforms each comprising at least one computer, server or other processing device, as well as other arrangements of processing devices. A number of examples of such systems will be described in detail herein. It should be understood, however, that embodiments disclosed herein are more generally applicable to a wide variety of other types of information processing systems and associated computers, servers or other processing devices or other components. Accordingly, the term "information processing system" as used herein is intended to be broadly construed so as to encompass these and other arrangements.

Figure 1:
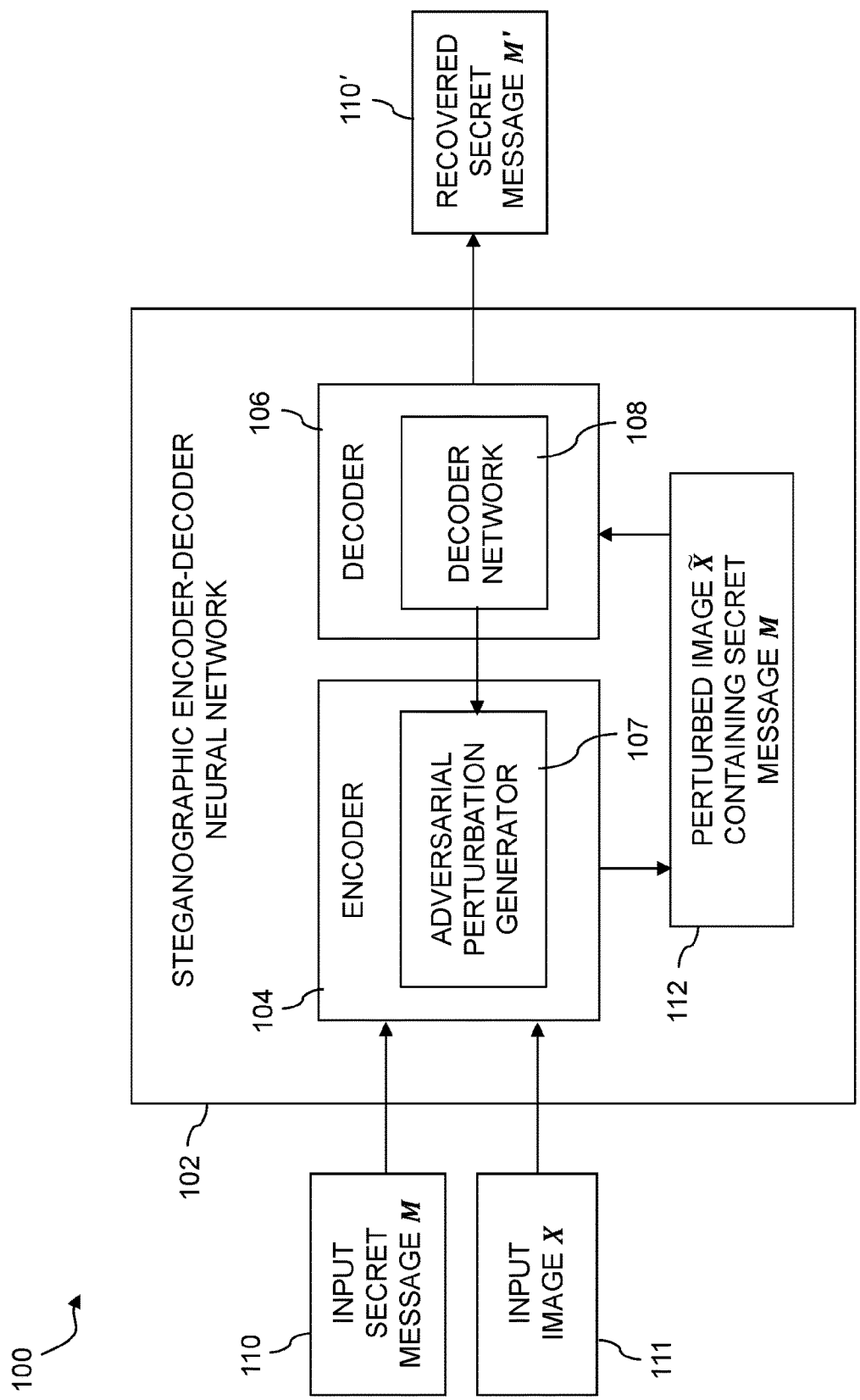
FIG. 1 is a block diagram of an information processing system that incorporates a steganographic encoder-decoder neural network utilizing adversarial perturbations in an illustrative embodiment.

FIG. 1 shows an example information processing system 100 that comprises a steganographic encoder-decoder neural network 102 in an illustrative embodiment. The steganographic encoder-decoder neural network 102 comprises an encoder 104 coupled to a decoder 106. As will be described in more detail below, the encoder 104 of the steganographic encoder-decoder neural network 102 is illustratively configured to utilize iterative adversarial perturbations generated by an adversarial perturbation generator 107 to obtain a perturbed image containing a secret message in an illustrative embodiment. In some embodiments, the iterative adversarial perturbations implemented by the encoder 104 result in a perturbed image that carries the secret message, and that when decoded by a decoder network 108 of the decoder 106, recovers the secret message at zero or very low error rate.

In this embodiment, an input secret message 110 and an input image 111 are applied to the encoder 104 of the steganographic encoder-decoder neural network 102. The input secret message 110, also illustratively denoted in the figure as input secret message M, is illustratively a secret digital message to be inserted into the input image 111 by incorporating one or more bits of the input secret message 110 into each of a plurality of pixels of the input image 111. The input image 111, also illustratively denoted in the figure as input image X, is sometimes referred to herein as a "cover image," and is an image into which the input secret message 110 is inserted by the encoder 104. It should be noted that terms such as "message" and "image" as used herein are intended to be broadly construed, as should not be viewed as being limited to any particular formats or configurations, such as those referred to in the context of illustrative embodiments herein. In some embodiments, the input secret message 110 itself comprises an image, or other arrangement of information characterizing an image. Also, the term "secret" as used herein in the context of a message is similarly intended to be broadly construed, so as to encompass, for example, a message that is known to a sending user or device but unknown to one or more unauthorized parties or devices.

The encoder 104 utilizes its adversarial perturbation generator 107 to generate a perturbed image 112 that contains the input secret message 110. The perturbed image 112 is also denoted in the figure as a perturbed image $\tilde{X}$ that contains the input secret message M. The perturbed image 112 is decoded in the decoder network 108 of the decoder 106, and information characterizing the decoded perturbed image is provided by the decoder 106 back to the encoder 104 for use in a next iteration of the encoder 104. The provided information illustratively comprises the decoded perturbed image itself, although additional or alternative types and arrangements of information characterizing the decoded perturbed image can be provided by the decoder 106 back to the encoder 104 in other embodiments. The decoded perturbed image generated by the decoder 106 illustratively comprises an instance of a recovered version 110' of the input secret message 110. The recovered version 110' of the input secret message 110 is also denoted in the figure as a recovered secret message M'.

The generation of perturbed image 112 by encoder 104, the decoding of the perturbed image 112 by decoder 106, and the providing of information characterizing the decoded perturbed image from the decoder 106 back to the encoder 104 are iteratively repeated, with different perturbations being determined in the adversarial perturbation generator 107 of the encoder 104 as a function of respective different instances of the provided information from the decoder 106, until the decoded perturbed image meets one or more specified criteria relative to the input secret message 110.

The different perturbations illustratively comprise respective adversarial perturbations configured to drive the decoder 106 towards generating a particular output when decoding the corresponding perturbed images. Such an arrangement generates perturbed images using what are referred to herein as "adversarial attacks." Adversarial attacks generally involve making small, often imperceptible, perturbations to images in order to obtain a desired output when the image is used as input for a neural network. Adversarial perturbations have shown to be effective against standard image transformations (e.g., different compression algorithms). These adversarial perturbations can be used to attack a neural network, for example, by forcing the neural network to output a particular classification result when presented with the perturbed image. However, illustrative embodiments disclosed herein instead utilize such adversarial perturbations in an entirely different way, namely, to facilitate the hiding of a secret message in an image, in a manner that can ensure that the error rate in the recovered secret message is zero or at or below a specified threshold.

The above-noted one or more specified criteria relative to the message illustratively include that the decoded perturbed image is identical to the input secret message 110, although additional or alternative criteria can be used in other embodiments. Accordingly, in some embodiments, the iterations are continued until the perturbed image 112 generated by the encoder 104, when decoded by the decoder 106, exactly reproduces the input secret message 110. In such an arrangement, the iterations illustratively continue until the recovered secret message M' is the same as the input secret message M. In other embodiments, the iterations may continue until the perturbed image 112 generated by the encoder 104, when decoded by the decoder 106, reproduces the input secret message 110 with an acceptably low error rate, for example, an error rate below a designated threshold.

At this point, the particular perturbed image 112 that corresponds to the decoded perturbed image that met the one or more specified criteria relative to the message is illustratively output by the steganographic encoder-decoder neural network 102 as a steganographic image containing the input secret message 110.

In some embodiments, generating the perturbed image 112 containing the input secret message 110 comprises determining for a given one of the multiple iterations a differential image computed between a message image and the decoded perturbed image, and utilizing the differential image to generate the perturbed image for a subsequent one of the iterations. The term "differential image" as used herein is intended to be broadly construed, so as to encompass, for example, information characterizing loss between the message image and the decoded perturbed image, as well as other types and arrangements of pixel-based differential information.

In some embodiments, the decoder network 108 of the decoder 106 illustratively comprises a first fixed network. For example, the first fixed network may comprise a multi-layer convolutional neural network that includes one or more convolution layers and one or more activation layers. As a more particular example, the first fixed network can comprise a five-layer convolutional neural network with convolution layers and leaky rectified linear unit ("LeakyReLU") activations. Such a neural network can be randomly initialized, with the weights for the neural network illustratively being drawn from a standard Gaussian distribution or other suitable distribution. This decoder network 108 takes a perturbed image from the encoder 104 as input, and outputs a decoded perturbed image, illustratively comprising bits of a recovered secret message. Gradient descent or other techniques as described in more detail elsewhere herein can be used to alter the perturbed image over multiple iterations until the output of the decoder network 108 is the desired bit string of the input secret message 110. In some embodiments, the decoder network 108 is deliberately configured to implement a neural network architecture that is particularly susceptible to adversarial attack. It is to be appreciated that numerous other types and arrangements of one or more neural networks can be used in implementing the decoder network 108 of the decoder 106.

The encoder 104 illustratively comprises, within or otherwise associated with adversarial perturbation generator 107, a second fixed network corresponding to the first fixed network of the decoder 106. For example, in some embodiments, both the encoder 104 and the decoder 106 implement respective instances of the same fixed decoder network, although other arrangements are possible.

In an embodiment in which the encoder 104 and the decoder 106 implement respective instances of the same fixed network, generating the perturbed image 112 containing the input secret message 110 illustratively comprises determining for a given one of the multiple iterations a differential image computed between a message image and the decoded perturbed image, and applying the differential image to the second fixed network within or otherwise associated with the adversarial perturbation generator 107 of the encoder 104 to generate the perturbed image 112 for a subsequent one of the iterations.

Additionally or alternatively, generating the perturbed image 112 containing the input secret message 110 illustratively comprises determining for a given one of a plurality of iterations a loss gradient between a message image and the decoded perturbed image, and utilizing the loss gradient to generate the perturbed image 112 for a subsequent one of the iterations.

The iterations are illustratively configured to optimize the perturbed image 112 by solving an optimization problem that includes as its objective function a minimization of binary cross entropy (BCE) loss. Additional or alternative loss measures may be minimized or otherwise optimized in other embodiments. Terms such as "optimization" and "optimize" as used herein are intended to be broadly construed, and should not be viewed as being restricted to determination of any particular absolute minimum or maximum values.

In some embodiments, the encoder 104 comprises a recurrent neural network that iteratively optimizes the perturbed image with respect to the loss gradient. For example, the recurrent neural network comprises a gated recurrent unit (GRU) having a hidden state, with the GRU being configured to update its hidden state in each of one or more of the iterations based at least in part on a current perturbation, the loss gradient and the first image.

Additional details regarding the operation of the neural networks in these and other embodiments are provided elsewhere herein.

The information processing system 100 illustratively comprises at least one processing platform that implements the steganographic encoder-decoder neural network 102, as well as one or more related systems, such as an image processing system. For example, the one or more processing platforms can implement additional processing circuitry associated with generating or otherwise processing the input secret message 110 and the input image 111, and for transmitting or otherwise outputting the perturbed image 112 and the recovered version 110' of the input secret message 110.

A given such processing platform illustratively comprises at least one processing device comprising a processor coupled to a memory.

Figure 2:
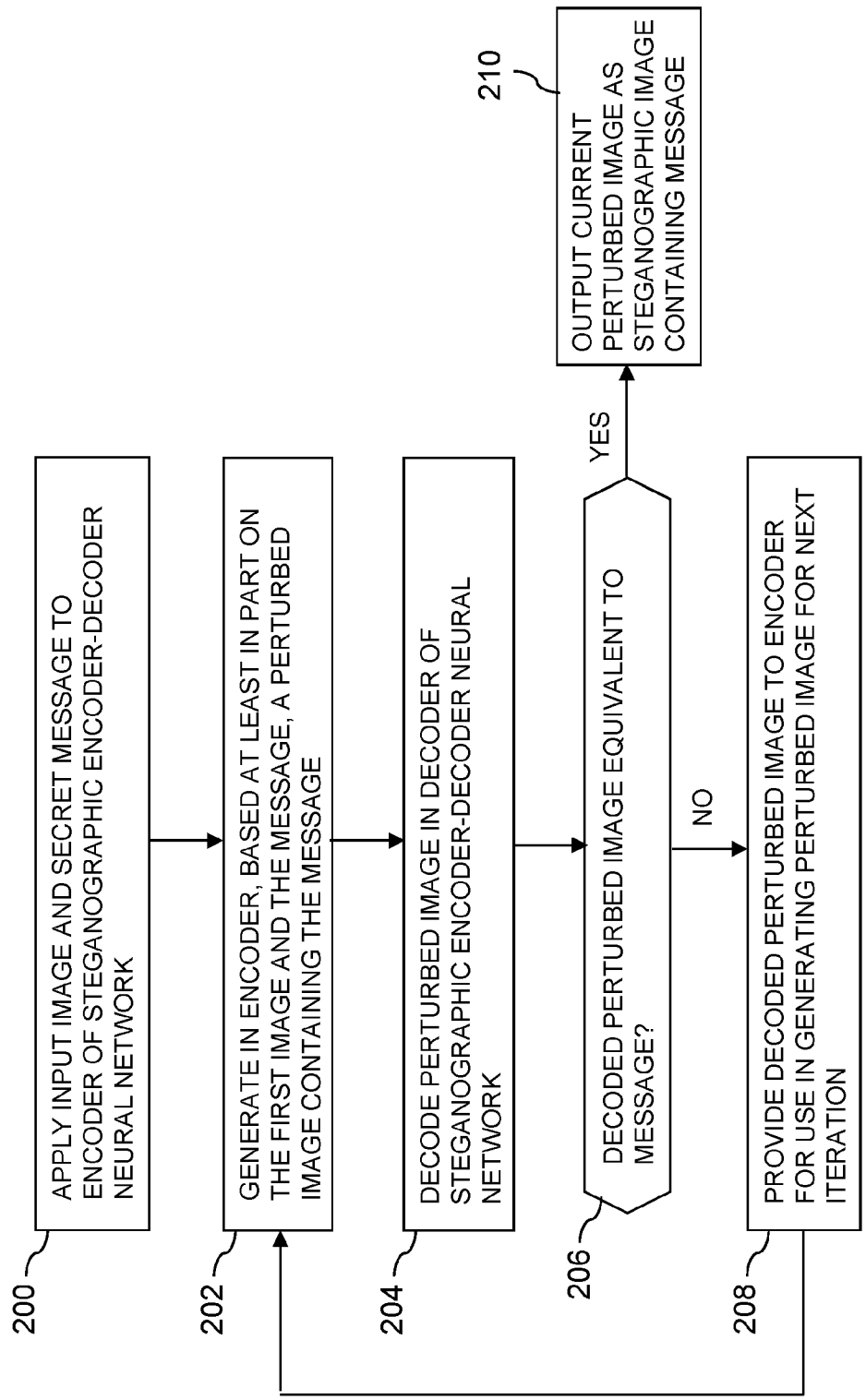
FIG. 2 is a flow diagram of an image steganography process utilizing adversarial perturbations in an illustrative embodiment.

FIG. 2 shows an exemplary image steganography process utilizing adversarial perturbations, illustratively implemented at least in part in the steganographic encoder-decoder neural network 102 of FIG. 1, although suitable for implementation in numerous other types of devices and systems.

It is to be understood that this particular process is only an example, and additional or alternative processes, utilizing other types and arrangements of processing operations, can be performed in an information processing system in other embodiments. In this embodiment, the process illustratively comprises steps 200 through 210.

In step 200, an input image and a secret message are applied to an encoder of a steganographic encoder-decoder neural network. The input image in some embodiments comprises an image that has been processed in various ways, depending upon the particular implementation. For example, in some embodiments relating to the provision of face anonymization functionality for shared images, the input image can comprise an original image that has been modified to replace a detected face with a replacement face, and the message can comprise a compressed and encrypted version of the detected face, as described in more detail elsewhere herein. Additional or alternative image processing operations can be applied in other embodiments. Terms such as "input image" and "original image" as used herein are therefore intended to be broadly construed, and should not be viewed as being limited in any way to images of particular formats or configurations, or to images that have not been subject to previous processing operations.

In step 202, the encoder generates, based at least in part on the first image and the message, a perturbed image containing the message. The perturbed image is provided to a decoder of the steganographic encoder-decoder neural network.

In step 204, the decoder decodes the perturbed image.

In step 206, a determination is made as to whether or not the decoded perturbed image is equivalent to the secret message. Responsive to a negative determination, the process moves to step 208, and otherwise moves to step 210, as indicated in the figure.

In step 208, which is reached if the decoded perturbed image is not equivalent to the secret message, the decoded perturbed image is provided to the encoder for use in generating a perturbed image for a next iteration. Additional or alternative information characterizing the decoded perturbed image can be provided to the encoder, such as, for example, a signal, distance measure, differential indicator or other information indicative of decoding error between the decoded perturbed image and the secret message. The process then returns to step 202, to generate the perturbed image for the next iteration, illustratively utilizing the first image and the message, as in the previous iteration.

In step 210, which is reached if the decoded perturbed image is equivalent to the secret message, the current perturbed image is output as a steganographic image containing the secret message.

Numerous other techniques can be used in association with implementation of image steganography utilizing adversarial perturbations as disclosed herein. For example, the determination in step 206 can be based on one or more criteria other than equivalence between the decoded perturbed image and the secret message. This can include various thresholding arrangements applied to respective loss measures computed between the decoded perturbed image and the secret message.

Accordingly, the particular processing operations and other functionality described in conjunction with the flow diagram of FIG. 2 are presented by way of illustrative example only, and should not be construed as limiting the scope of the invention in any way. Alternative embodiments can use other types of processing operations involving neural networks and other types of devices and systems. For example, the ordering of the process steps may be varied in other embodiments, or certain steps may be performed concurrently with one another rather than serially. Also, multiple instances of the process may be performed in parallel with one another within system 100 for different input image and secret message pairs. Accordingly, system 100 can simultaneously implement multiple parallel image steganography processes using the techniques disclosed herein.

Additional aspects of illustrative embodiments will now be described with reference to FIGS. 3 through 10.

Referring now to FIG. 3, an example algorithm for image steganography utilizing adversarial perturbations is shown. The example algorithm in this embodiment more particularly comprises an algorithm denoted in the figure as Algorithm 1, implementing an adversarial attack for message hiding. It is assumed in this embodiment that the encoder and decoder illustratively implement the same fixed neural network F. Such embodiments are also referred to herein as fixed neural network steganography (FNNS) embodiments.

In an example FNNS workflow, a sender ("Alice") encodes the message M into image $\widetilde{X}$ such that $F(\widetilde{X})=M$ and a receiver ("Bob") decodes the message with the same decoder F. Alice generates perturbed image $\widetilde{X}$ by using the gradient from the loss between the decoder output $F(\widetilde{X})$ and secret message M. References herein to "Alice" and "Bob" are intended to be broadly construed so as to encompass, for example, respective sending and receiving devices of an information processing system.

Let $X \in [0,1]^{H \times W \times 3}$ be an RGB color image with height H and width W. Further, let $M \in \{0,1\}^{X \times W \times D}$ be a message that is to be concealed in X, where D specifies the number of bits to be hidden per pixel. As indicated above, it is assumed that there are two parties involved, namely, the sender, Alice, who hides M in X, creating $\widetilde{X}$; and the receiver, Bob, who extracts M out of $\widetilde{X}$. Given a decoder network $F: [0,1]^{H \times W \times 3} \rightarrow [0,1]^{H \times W \times D}$, this embodiment generates a perturbed image $\widetilde{X}$, which is sufficiently close to X in accordance with one or more metrics described below, and such that $F(\widetilde{X})=M$.

An adversarial perturbation approach is used to generate the perturbed image $\widetilde{X}$, as described previously. More particularly, in this embodiment, given the cover image X and the ground truth message M, the sender solves the following optimization problem over the perturbed image $\widetilde{X}$:

$$\min_{\widetilde{X}} \underbrace{\langle M, \log F(\widetilde{X})\rangle + \langle (1-M), \log(1-F(\widetilde{X}))\rangle}_{L_{BCE}},$$

$$\text{s.t. } \|X - \widetilde{X}\|_\infty \leq \epsilon \text{ and } 0 \leq \widetilde{X} \leq 1,$$

where $\langle , \rangle$ denotes inner-product across all H×W×D dimensions and the objective function is the binary cross entropy (BCE) loss. The first of the two linear constraints enforces that the maximum perturbation does not exceed a value of E and stays imperceptible. The second constraint enforces that the perturbed image $\widetilde{X}$ is a well-defined image, with pixel values ranging within [0,1].

Algorithm 1 of FIG. 3 optimizes the above-described objective function. In Algorithm 1, $\text{clip}_0^1(x)=\max(\min(x,1),0)$. This embodiment uses an unconstrained L-BFGS algorithm to optimize the objective with respect to $\widetilde{X}$. L-BFGS is used in this embodiment because it keeps track of second order gradient statistics and results in faster optimization. To ensure that the constraints are not violated, the solution back is projected into the feasible region after k steps. It is assumed that the receiver has access to the same fixed decoder network F as the sender. The receiver can therefore recover the concealed message M by computing $F(\widetilde{X})$, as previously described.

The example encoding process in this embodiment optimizes the image $\widetilde{X}$ directly and considers the weights of F fixed throughout. This permits the use of multiple variants for the encoder to initialize $\widetilde{X}$ and to obtain weights for the decoder F. Examples of such variants include at least the following.

1. FNNS-R: F is a random network and $\widetilde{X}$ is initialized to be the cover image X. When a random network is used, the sender and the receiver only need to share the architecture of the decoder network and the random seed used to initialize its weights; the actual weights of the network do not have to be shared. Additionally, if the image quality of the perturbed image is low, a different random decoder can easily be initialized with a new random seed and the optimization can be repeated.

2. FNNS-DE: Given a trained encoder-decoder pair, F is defined as a pre-trained decoder and $\widetilde{X}$ is initialized as Enc(X, M), where Enc is the trained encoder that is paired with the decoder F. With this example initialization, a part of the message M is already encoded into $\widetilde{X}$ such that $F(\widetilde{X})$ M. As a result, the optimization is much faster. However, the encoding step sometimes deteriorates image quality, and it is hard for the optimization algorithm to "recover" in terms of quality in such cases.

3. FNNS-D: F is a pre-trained decoder and $\widetilde{X}$ is initialized to be the cover image X. With a trained decoder, messages can be hidden in images using both perturbations and by training weights conducive to hiding information in the images. As a result, the output image quality is better and the optimization does not suffer from getting stuck in bad local optima.

As indicated previously, in some embodiments, the fixed decoder network architecture is selected based at least in part on its susceptibility to adversarial attacks.

For example, some embodiments disclosed herein utilize as the fixed decoder network a basic decoder similar to that described in K. A. Zhang et al, "SteganoGAN: High Capacity Image Steganography with GANs," arXiv preprint arXiv: 1901.03892, 2019, which is incorporated by reference herein in its entirety. In such an embodiment, the fixed decoder network illustratively comprises a 4-layer convolutional neural network that takes an H×W×3 RGB image as input and outputs a bit string $\{0, 1\}^{H \times W \times D}$ after rounding. Again, numerous other fixed decoder networks can be used in other embodiments.

The following example metrics are utilized to evaluate image quality in some embodiments, where MSE denotes mean squared error, PSNR denotes peak signal-to-noise ratio and SSIM denotes structural similarity index measure. Note that $c_1$, $c_2$ in the SSIM equation are small stabilization constants. Additional or alternative metrics can be used to evaluate image quality in other embodiments.

$$MSE = \frac{1}{HW}\sum_{i=1}^{H}\sum_{j=1}^{W}[X_{i,j} - \widetilde{X}_{i,j}]^2$$

$$PSNR = 20\log_{10}(\max_X) - 10\log_{10}(MSE)$$

$$SSIM = (2\mu_X\mu_{\widetilde{X}}+c_1)(2\sigma_{X\widetilde{X}}+c_2)/(\mu_X^2+\mu_{\widetilde{X}}^2+c_1)(\sigma_X^2+\sigma_{\widetilde{X}}^2+c_2)$$

In some embodiments, the above-noted pre-trained encoder and decoder for FNNS-D and FNNS-DE were configured as the trained SteganoGAN encoder and decoder. For the FNNS-R random network, a number of different variations with different depths, widths, normalization layers, and activation functions were explored, and evaluated with respect to bit error rates, PSNR, and SSIM.

More particularly, 128 hidden channels were used in FNNS-R and 32 in FNNS-D and FNNS-DE in some embodiments. This is at least in part because for trained SteganoGAN models, increasing the number of hidden units leads to no significant improvement in accuracy or image quality, but slows down the optimization process.

Other embodiments to be described below implement what is referred to herein as learned iterative steganographic optimization (LISO). As will be described, LISO embodiments disclosed herein are highly efficient in hiding messages inside images, and can achieve very low message recovery error rates. The encoder is illustratively implemented as a learned recurrent neural network that iteratively solves the above-noted optimization problem and mimics the steps of a gradient-based optimization method. Some LISO embodiments further include, in addition to one or more hard constraints, a critic component, similar to that described in the above-cited SteganoGAN reference, configured to ensure that the perturbations remain imperceptible and that the output steganographic image looks natural.

In some embodiments, the LISO encoder is configured to learn an update rule of a general gradient-based optimization algorithm for steganography and is trained simultaneously with a corresponding decoder. The resulting encoder-decoder neural network can learn more efficient descent directions than standard image-unaware optimization algorithms such as PGD or L-BFGS and can produce better steganography results with great consistency. For example, in illustrative LISO embodiments, the iterative optimization implemented in the encoder can reliably circumvent bad local minima and find a low-error solution within only a few iterations, even when processing previously unseen cover images and random secret bit strings. Some LISO embodiments illustratively follow this iterative optimization with one or more additional iterations of L-BFGS optimization, and can provide 100% error free recovery even with 3 bits per pixel (bpp) of hidden information.

Accordingly, some embodiments disclosed herein utilize multiple distinct optimization phases each with a distinct type of optimization, such as a first phase of LISO optimization followed by a second phase of L-BGFS optimization, each of which illustratively includes multiple iterations.

Additionally or alternatively, some embodiments disclosed herein are configured to incorporate additional constraints like producing JPEG resistant steganographic images, where JPEG denotes an image encoding standard of the Joint Photographic Experts Group. Such steganographic images advantageously provide lower error rates in recovered messages even in the presence of JPEG encoding.

Example LISO embodiments will now be described in more detail with reference to FIGS. 4 and 5.

FIG. 4 shows an example iterative optimization algorithm implemented in some LISO embodiments.

Figure 5A:
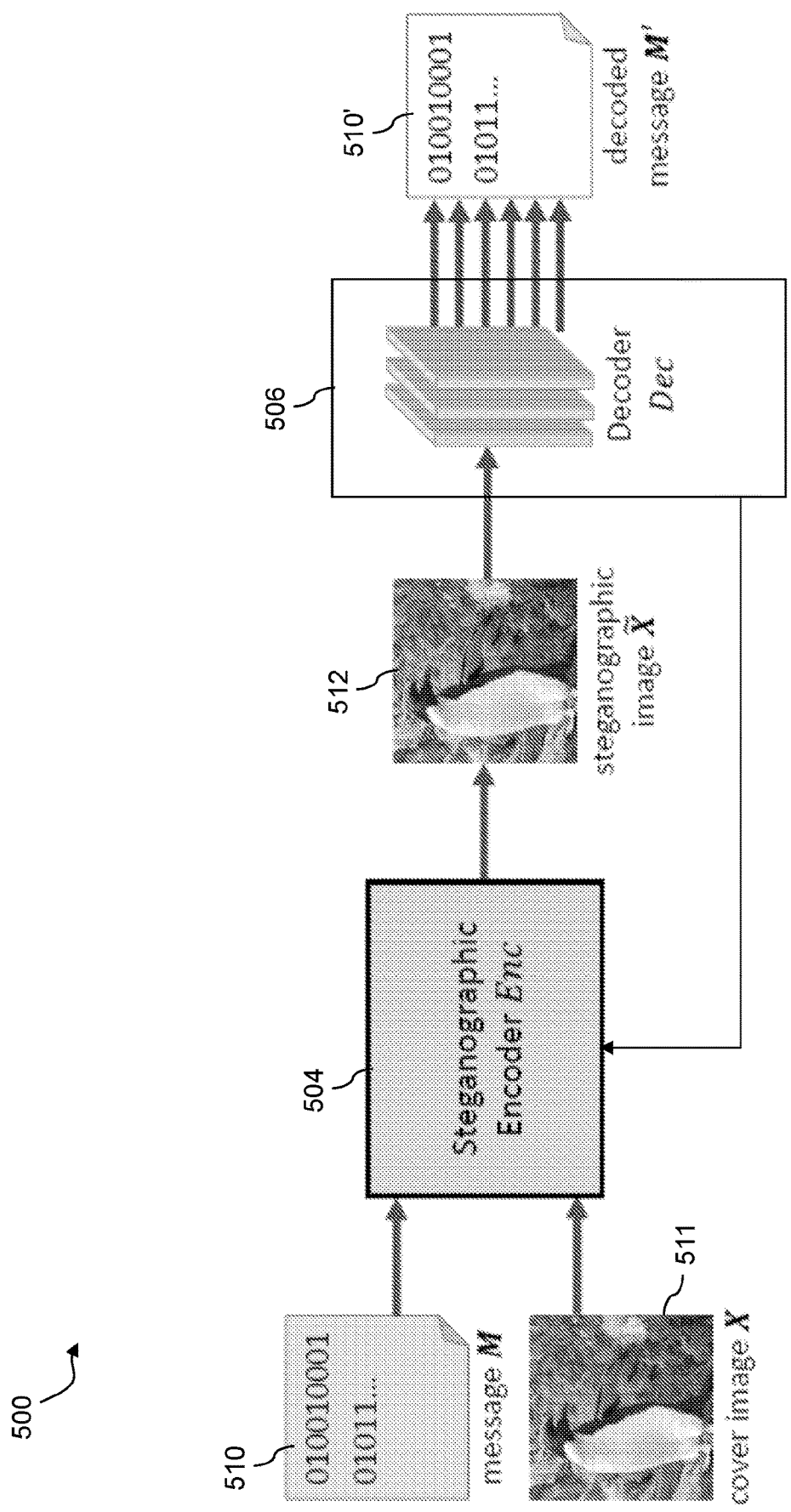
FIGS. 5A and 5B illustrate the operation of an information processing system configured for learned iterative steganographic optimization in an illustrative embodiment. These two FIGS. are collectively referred to herein as FIG. 5.
Figure 5B:
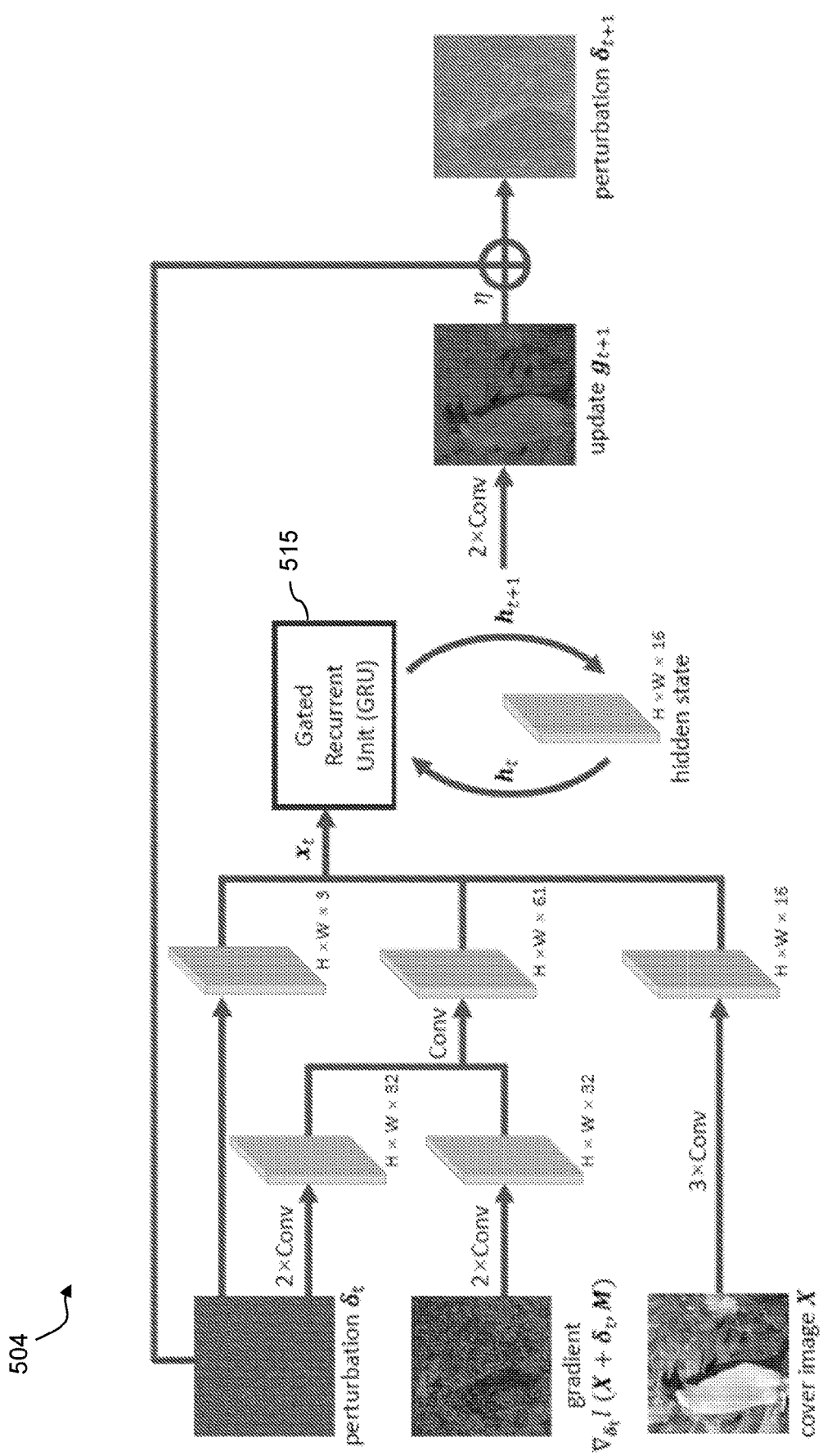

FIG. 5A shows an information processing system 500 that includes a steganographic encoder-decoder neural network comprising a steganographic encoder 504 and a corresponding decoder 506. The encoder 504 and decoder 506 are also denoted in the figure as Enc and Dec, respectively. In a manner similar to that previously described, the encoder 504 receives as inputs a secret message 510 and a cover image 511 and interacts with the decoder 506 to iteratively generate an output steganographic image 512. The decoder 506 decodes the output steganographic image 512 to generate a decoded message 510'. FIG. 5B shows a more detailed view of the encoder 504, which includes multiple convolution layers arranged as shown and a GRU 515 having a corresponding hidden state.

Let $X \in [0,1]^{H \times W \times 3}$ denote an RGB cover image with height H and width W. In some embodiments, the image may be in a JPEG format, a Portable Network Graphics (PNG) format (e.g., PNG-24), or another type of format in which pixel values are quantized. The hidden message M is a bit-string of length m=H×W×B reshaped to match the cover image's size, i.e. $M \in \{0,1\}^{H \times W \times B}$, where payload B denotes the number of encoded bits per pixel (bpp). If the number of bits is not a multiple of H×W, zero padding is used. The goal of image steganography is to conceal M in a new steganographic image $\tilde{X} \in [0,1]^{H \times W \times 3}$, that looks visually identical to X, such that M can be transmitted undetected under the cover of $\tilde{X}$. To do so, steganographic encoder Enc takes as input X and M and outputs $\tilde{X}$. The decoder Dec is designed to recover the message, M'=Dec($\tilde{X}$), with decoding error $$\epsilon = \frac{\|M' - M\|_0}{m} \text{ (ideally } \epsilon = 0\text{)}.$$

Some LISO embodiments are configured to solve the following constrained optimization problem, which is similar in some respects to that previously described above in conjunction with example FNNS embodiments:

$$\min_{\tilde{x} \in [0,1]^{H \times W \times 3}} L_{acc}(Dec(\tilde{X}), M) + \lambda L_{qua}(\tilde{X}, X)$$

$$L_{acc}(M', M) := \overbrace{\langle M, \log M' \rangle + \langle (1-M), \log(1-M') \rangle}^{\text{binary cross-entropy loss}}$$

$$L_{qua}(\tilde{X}, X) := \underbrace{(\|\tilde{X} - x\|)_2}_{\text{mean-square error}},$$

where $\langle \cdot \rangle$ denotes the dot product operation, and $\lambda$ is a weight factor. Note that in this optimization only the perturbed image $\tilde{X}$ is being optimized and the decoder Dec is kept fixed throughout. The accuracy loss $L_{acc}$ (M', M) encourages the message decoding error to be low, and the quality loss $L_{qua}$ (X, $\tilde{X}$) encourages the steganographic image to look similar to the cover image. The objective in this example constrained optimization problem is also denoted herein as loss $\tilde{X}, (\ell, M)$.

The example iterative optimization algorithm of FIG. 4 is used to solve the above-described optimization problem in some embodiments, although it is to be appreciated that numerous other solvers can be used in other embodiments. The example iterative optimization algorithm is an iterative, gradient-based hill-climbing algorithm. Here $\eta > 0$ is a step-size, and $g(\cdot)$ is an update function defined by the specific optimization method. The perturbation $\delta$ is iteratively optimized, where $\tilde{X}=X+\delta$, to minimize the loss $\ell$ within the image pixel constraints. The function $g(\cdot)$ can simply be a gradient of the loss (clipped if an update exceeds the pixel boundary [0,1]), or an approximate second order update as in L-BFGS. Note that in the latter, $g(\cdot)$ maintains an internal state to approximate the Hessian of the loss. This is an example of what is more generally referred to herein as a "hidden state." As indicated previously, some FNNS embodiments disclosed herein utilize L-BFGS repeatedly for a fixed set of updates and project the perturbed image onto the [0, 1] hyper-cube.

Unlike illustrative embodiments disclosed herein, the above-noted SteganoGAN approach utilizes a single forward pass arrangement with the trained encoder and decoder, which increases speed but yields high error rates of up to 5-25% for 4 bpp. Ultimately, it is very hard to train a neural network to accurately predict the solution of an iterative optimization problem in a single forward pass.

On the other hand, optimization-based approaches can result in substantially low error rates than the SteganoGAN approach, but can be much slower, in some cases requiring thousands of iterations. Furthermore, the resulting recovery error depends heavily on the weights of the decoder and the initialization of $\delta$. For example, with B≥4 the optimization can get stuck in a local minima before reaching zero error.

LISO embodiments disclosed herein overcome these issues and provide an image steganography approach that is both fast and exhibits low recovery error. In some LISO embodiments, the encoder is designed to be iterative, such that it approximates the function $g(\cdot)$ in the iterative optimization algorithm of FIG. 4.

The optimization procedure implemented in the encoder can be viewed as a recurrent neural network with a hidden state that iteratively optimizes the perturbation $\delta$ with respect to the loss $\ell$. At each iteration it obtains the previous estimate $\delta_{t-1}$ and the gradient of $\ell$ as input and produces a new $\delta_t$. The hidden state allows LISO to learn what optimization method is best suited for this task. After multiple iterative steps, the encoder outputs the steganographic image.

The decoder illustratively comprises a feed-forward convolutional neural network trained to retrieve the message from the steganographic image.

The critic network illustratively comprises a neural classifier, in some embodiments configured as one or more generative adversarial network (GAN) discriminators, that is trained to identify whether a given image is an original cover image or a steganographic image with a hidden message.

As these components are fully differentiable, the iterative encoder, the decoder, and the critic network can all be learned jointly.

Table 1 below compares LISO with both learned and optimization based steganography methods, including the conventional SteganoGAN approach and the FNNS-R and FNSS-D approaches disclosed herein.

TABLE 1

Comparison of Learned and Optimization-Based Steganography Methods

| Method | Type | Encoder | Speed | Decoder |
|---|---|---|---|---|
| SteganoGAN | Learned | Learned 1-step Network | Fast | Learned Network |
| FNNS-R | Optimization | L-BFGS/PGD | Slow | Random Network |
| FNNS-D | Optimization | L-BFGS/PGD | Slow | Fixed Pre-trained Network |
| LISO | Hybrid | Learned Iterative Network | Fast | Learned Network |

In some LISO embodiments, the decoder and the critic each include three convolutional blocks, with each such block containing a convolutional layer with 3×3 kernels, batch-norm and leaky ReLU, similar to those described in the SteganoGAN reference. In the decoder, the convolutional blocks are followed by another convolutional layer that maps the features maps to an H×W×3 image. In the critic, the convolutional blocks are followed by an adaptive mean pooling layer to get a scalar output that denotes a prediction of whether or not a given image has a hidden code.

Referring again to FIG. 5B, the encoder 504 illustratively comprises multiple convolutional layers arranged as shown. The convolutional layers comprise 3×3 convolutional kernels with stride 1, and are followed by respective ReLU activation layers. The iterative optimization network functions as function g(·) in the iterative optimization algorithm of FIG. 4. More particularly, the function g(·) in FIG. 4 is approximated using a fully convolutional network comprising GRU 515. The GRU 515 has an internal state, more generally referred to herein as a hidden state, and keeps track of information relevant to the optimization.

The encoder 504 takes as input the cover image X, the current perturbation $\delta_{t-1}$ and the gradient of the loss with respect to the perturbed image $\nabla_{\delta_{t-1}} l(X+\delta_{t-1}, M)$ and predicts the perturbation $\delta_t$ for the next step as shown in FIG. 5B. The hidden state $h_0$ of the GRU 515 is initialized with a feature extractor, not explicitly shown in the figure, that illustratively comprises a 3-layer fully convolutional network that extracts features from the input image. The input to the GRU 515 in subsequent steps $x_t$ is constructed by concatenating the extracted features from current perturbation $\delta_{t-1}$, the gradient $\nabla_{\delta_{t-1}} l(X+\delta_{t-1}, M)$ and the cover image X. The GRU 515 updates its hidden state $h_t$, and the hidden state is processed by additional convolutional layers to produce a gradient-type step g. The final update becomes $\delta_t = \delta_{t-1} + \eta g_t$, where $\eta$ is the step size for the new update. The step size is set as $\eta=1$ during training, but it can be changed during testing. To avoid information loss in pixel-wise encoding and decoding, the encoder 504 is fully convolutional and has no down-sampling or up-sampling layers. The steganographic image, the final output of the encoder 504, is produced through multiple iterations and output as a final steganographic image $\tilde{X}=X+\eta \Sigma_t g_t$.

The entire LISO pipeline, comprising the iterative encoder, the decoder, and the critic, is trained end-to-end. As with GAN discriminators, the critic and the encoder-decoder network are optimized in alternating steps. During the training of the encoder-decoder network, the loss is applied to all intermittent updates, however with exponentially increasing weights, illustratively given by $\gamma_{T-t}$ at step t. With intermittent predictions denoted as $\tilde{X}_1, \ldots, \tilde{X}_T$ for $t=1, \ldots, T$ the loss becomes:

$$L_{train} = \sum_{t=1}^{T} \gamma^{T-t} [L_{acc}(M, \tilde{X}_t) + \lambda L_{qua}(X, \tilde{X}_t) + \mu L_{crit}(X, \tilde{X}_t)]$$

where $\gamma \in (0,1)$ is a decay factor and $L_{crit}$ denotes the critic loss (with weight ($\mu$>0.) Despite the predictions being sub-optimal from earlier iterations, we still make use of the loss from earlier iterations because they do provide useful update directions for later iterations. Note that this loss is similar to that described previously in conjunction with the constrained optimization problem, but there is an additional critic loss term that ensures that the steganographic image looks like a natural image. As the critic loss is computed and utilized at each iteration, the encoder 504 is encouraged to stay on or near the manifold of natural images throughout the iterative optimization process.

The learned iterative encoder 504 and decoder 506 are utilized to perform inferencing. The iterative encoder 504 performs a gradient-style optimization on the cover image to produce the steganographic image with the hidden message. Mathematical optimization algorithms like L-BFGS have strong theoretical convergence guarantees, which assure fast and highly accurate convergence within the vicinity of a global minimum, but for non-convex optimization problems they have the tendency to get stuck in a local minima. The learned iterative encoder 504 has no theoretical convergence guarantees, but is very efficient at finding the local vicinity of a good minimum.

In some embodiments, the above-described LISO optimization is first used to obtain an initial perturbed image $\tilde{X}$ and is then followed by a one or more additional steps of FNNS optimization performed on the LISO decoder 506, utilizing either PGD or L-BFGS optimization. Such arrangements are referred to herein as LISO+PGD or LISO+L-BFGS, depending on whether PGD or L-BFGS is used. The trained decoder 506 is then used to extract the message from the steganographic image.

For example, in some LISO embodiments, the above-described LISO optimization finds a very good approximate solution but there might still be a few bits decoded incorrectly (e.g., on the order of 0.01%). FNNS as disclosed herein works in a complementary manner to trained encoder-decoder networks and can be used in conjunction with any trained encoder-decoder network. Accordingly, some embodiments implement a combination of LISO and FNNS, illustratively LISO+L-BFGS, by using the trained decoder from LISO as the fixed network. After first encoding a message into a cover image by using the LISO encoder 504 as described above, L-BFGS optimization is used to further reduce the error rate. The error rate after LISO is already quite low and hence only a few additional L-BFGS iterations are required to reduce the error to zero. As with FNNS, 0% error can be achieved for up to 3 bpp but often in drastically fewer iterations.

Experiments were performed on illustrative embodiments, as will now be described in conjunction with FIGS. 6, 7 and 8.

In these experiments, illustrative embodiments were evaluated on the following three datasets: Div2k, a scenic image dataset that has 800 images for training and 100 for validation; CelebA, a facial image dataset which contains 202,599 facial images of celebrities, 1000 of which were sampled for training and another 1000 sampled for validation; and MS COCO, a dataset which contains 118,287 images of common household objects and scenes, out of which 1000 were sampled for training and another 1000 for validation. It was found that the 800 training images in the case of Div2K and the 1000 training images in the case of CelebA and MS COCO were generally sufficient to allow LISO embodiments to achieve excellent performance in terms of amount of hidden information and recovered message error rate.

During training, the basic decoder of SteganoGAN was used in LISO and all baseline models. Network parameters were set for training including the number of encoder iterations T=15, the step size $\eta$=1, the decay $\gamma$=0.8 and loss weights $\Delta$=$\mu$=1. All networks are trained from scratch.

During inferencing, to get better results, some embodiments iterate with a smaller step size $\eta$ for a larger number of iterations T. For example, throughout these evaluations, the inference step size is set to $\eta$=0.1 and iterated with the encoder network until the decoding error rate converges. The average and maximum numbers of iterations required to minimize the decoding error rate for different values of bpp are shown in Table 2 below. This portion of the evaluation is performed on the validation images of the Div2k dataset set until convergence. Each iteration, on average, takes about 29 milliseconds (ms) for a 512×512 RGB image on a Nvidia Titan RTX GPU processing device.

TABLE 2

Number of Iterations to Reach Minimum Decoding Error Rate

| Bits per Pixel (bpp) | Average Iterations | Max Iterations |
|---|---|---|
| 1 | 6.44 | 18 |
| 2 | 9.50 | 17 |
| 3 | 11.36 | 21 |
| 4 | 11.15 | 24 |

It can be seen from Table 2 that the average number of iterations is consistently below the number of iterations used during training, T=15, although some images require up to 24 iterations. These results suggest that in practice LISO just needs a few corrective steps to achieve very low decoding error rates.

Figure 6:
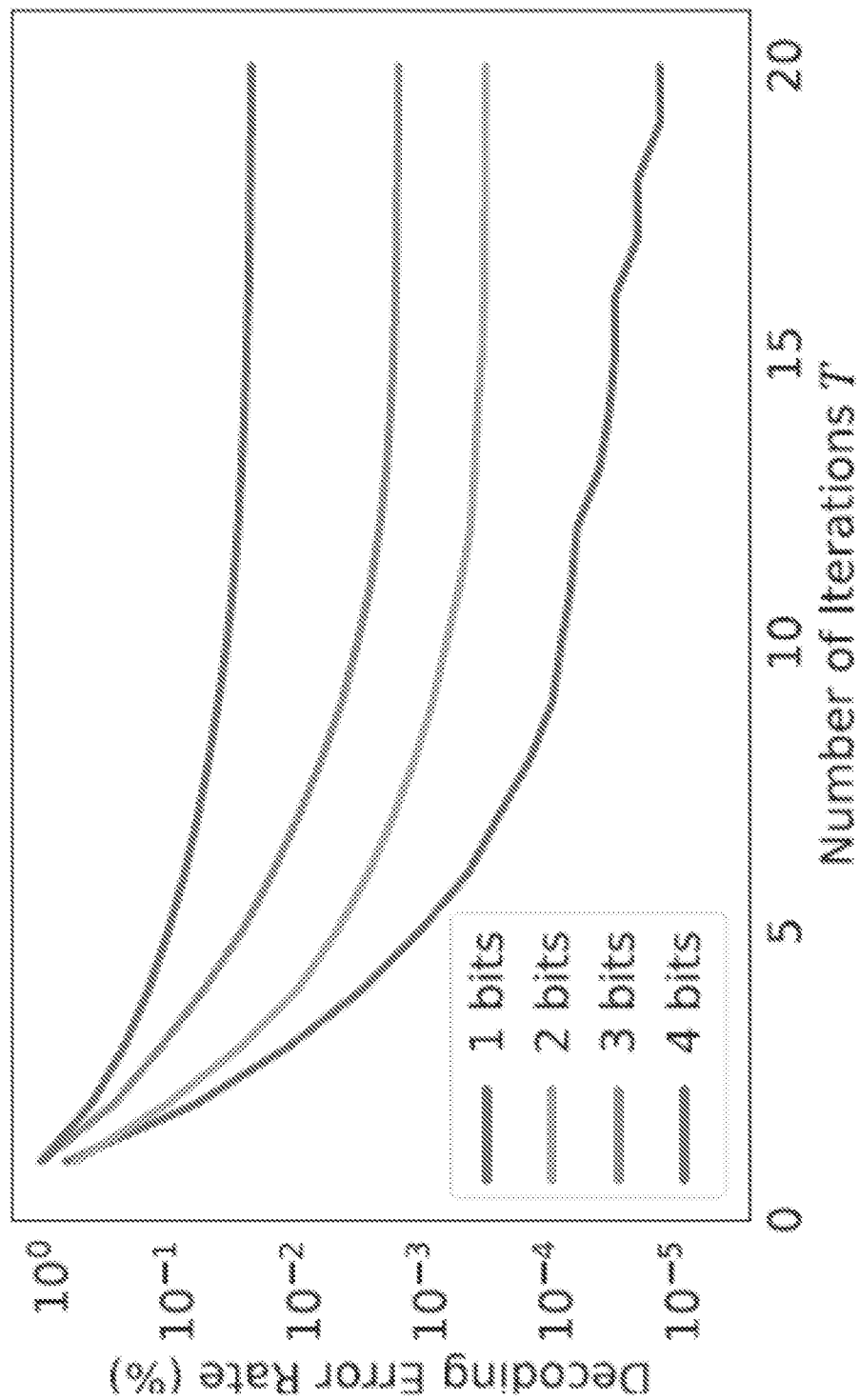
FIGS. 6, 7 and 8 are graphical plots showing performance of illustrative embodiments in terms of error rate and loss as a function of number of iterations.

FIG. 6 illustrates how the decoding error rate decreases over time during testing in illustrative embodiments. More particularly, this figure illustrates LISO decoding error rate with respect to number of iterations T under different bpp values, evaluated on Div2k's validation set. The y-axis is shown in log scale. The monotonicity of the graphs indicates that the optimization loss is well aligned with decoding error and that LISO is successful at learning to find suitable descent directions.

Image steganography performance of LISO, FNNS-D and LISO+L-BFGS embodiments disclosed herein is compared to that of conventional SteganoGAN in Table 3 below, for the three datasets Div2K, CelebA and MS COCO, in terms of decoding error rate, PSNR and SSIM. It was found that the recovery error rates of LISO are an order of magnitude lower when compared to SteganoGAN. The image quality as measured by PSNR scores is also far superior, while SSIM scores are comparable. LISO embodiments therefore achieve much lower error rates and higher PSNR than conventional SteganoGAN in all experiment settings.

It can also be seen from Table 3 that LISO is able to achieve an error rate of exactly 0% under 3 bpp when it is paired with a few steps of direct L-BFGS optimization. Such a learned iterative embodiment was able to achieve the same performance that obtained from a direct optimization method such as FNNS, but in far fewer optimization steps and therefore in less time. The ability of LISO embodiments to learn from past optimizations and to stay on the image manifold allows such embodiments to achieve a low error rate and high image quality. Such embodiments also provide an initialization for further L-BFGS optimization near a good minima in the case of LISO+L-BFGS.

TABLE 3

Image Steganography Performance

| Dataset | Method | Error Rate (%) ↓ | | | | PSNR ↑ | | | | SSIM ↑ | | | |
|---|---|---|---|---|---|---|---|---|---|---|---|---|---|
| | | 1 bit | 2 bits | 3 bits | 4 bits | 1 bit | 2 bits | 3 bits | 4 bits | 1 bit | 2 bits | 3 bits | 4 bits |
| Div2k | SteganoGAN | 5.12 | 8.31 | 13.74 | 22.85 | 21.33 | 21.06 | 21.42 | 21.84 | 0.76 | 0.76 | 0.77 | 0.78 |
| | LISO | 4E−05 | 4E−04 | 2E−03 | 3E−02 | 33.83 | 33.18 | 30.24 | 27.37 | 0.90 | 0.90 | 0.85 | 0.76 |
| | FNNS-D | 0.00 | 0.00 | 0.1 | 5.45 | 29.30 | 26.25 | 22.90 | 25.74 | 0.82 | 0.73 | 0.53 | 0.65 |
| | LISO + L-BFGS | 0.00 | 0.00 | 0.00 | 1E−05 | 33.12 | 32.77 | 29.58 | 27.14 | 0.89 | 0.89 | 0.82 | 0.74 |
| CelebA | SteganoGAN | 3.94 | 7.36 | 8.84 | 10.00 | 25.98 | 25.53 | 25.70 | 25.08 | 0.85 | 0.86 | 0.85 | 0.82 |
| | LISO | 4E−04 | 1E−03 | 4E−03 | 1E−01 | 35.62 | 36.02 | 32.25 | 30.07 | 0.89 | 0.90 | 0.82 | 0.79 |
| | FNNS-D | 0.00 | 0.00 | 0.00 | 3.17 | 36.06 | 34.43 | 30.05 | 33.92 | 0.87 | 0.86 | 0.71 | 0.84 |
| | LISO + L-BFGS | 0.00 | 0.00 | 0.00 | 7E−05 | 35.40 | 35.63 | 31.61 | 28.36 | 0.89 | 0.89 | 0.79 | 0.71 |
| MS COCO | SteganoGAN | 3.40 | 6.20 | 11.13 | 15.70 | 25.32 | 24.27 | 25.01 | 24.94 | 0.84 | 0.82 | 0.82 | 0.82 |
| | LISO | 2E−04 | 5E−04 | 3E−03 | 4E−02 | 33.83 | 32.70 | 27.98 | 25.46 | 0.90 | 0.89 | 0.75 | 0.68 |
| | FNNS-D | 0.00 | 0.00 | 0.00 | 13.65 | 37.94 | 34.51 | 27.77 | 34.78 | 0.95 | 0.90 | 0.72 | 0.89 |
| | LISO + L-BFGS | 0.00 | 0.00 | 0.00 | 1E−05 | 33.42 | 31.80 | 26.98 | 25.17 | 0.90 | 0.87 | 0.70 | 0.67 |

It was also found that the qualitatively observed steganographic image quality is quite good for LISO embodiments, even when a large number of bits per pixel are hidden in the cover images. Changes in hue were observed in some of the images from the CelebA dataset, but it was also found that these hue changes disappeared if training was performed using a more diverse dataset, not limited to faces as in the CelebA dataset, even if the resulting trained encoder is subsequently applied to faces during testing. In contrast to conventional image steganography techniques that can produce unnatural Gaussian noise, the perturbations in LISO embodiments are very smooth and natural. This is due at least in part to the use of a critic network that helps ensure that the resulting output steganographic image is not easily distinguishable from other cover images. In some embodiments, the trade-off between error rate and image quality can be explicitly controlled by changing the weights λ and μ on the loss terms if desired.

Figure 7:
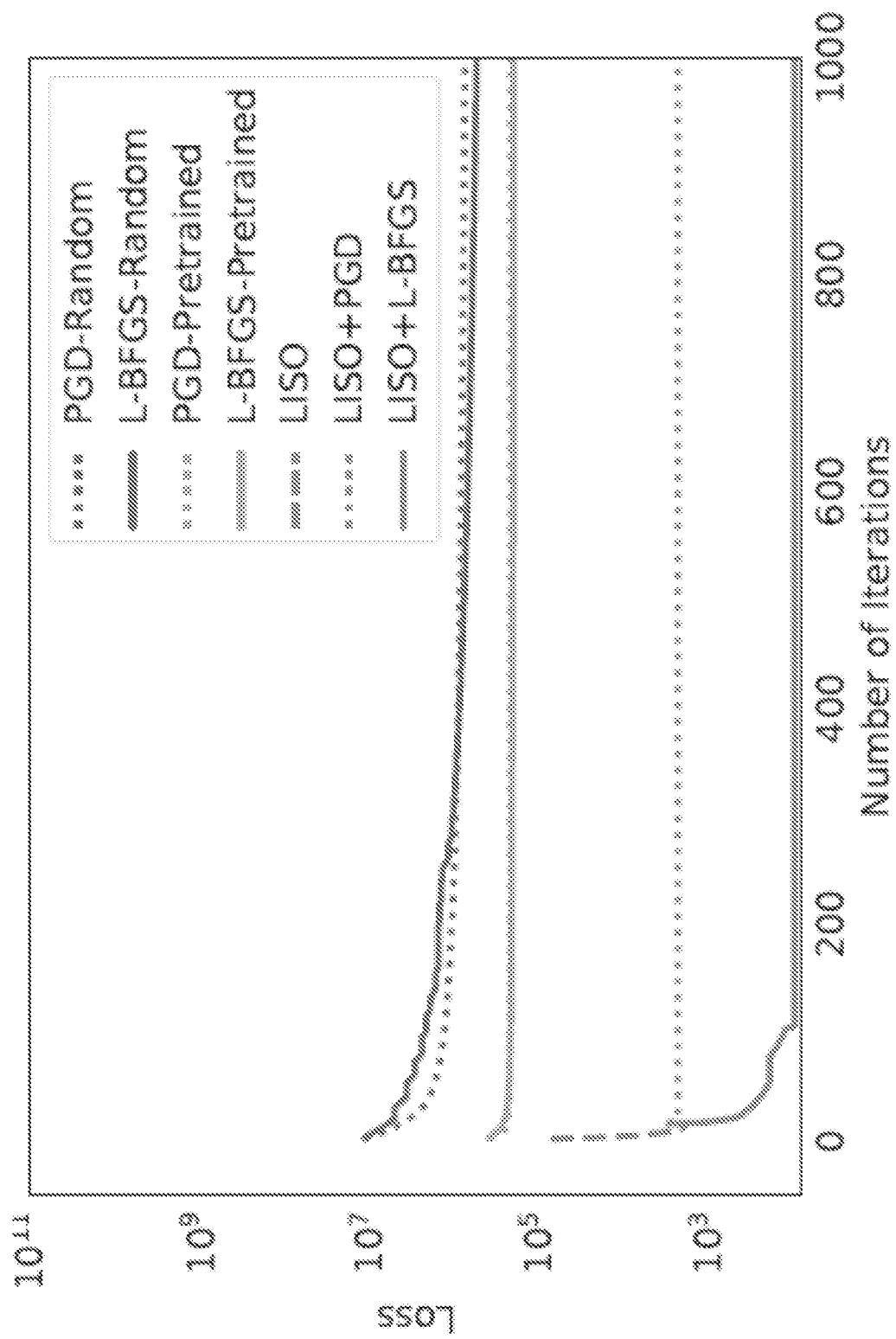
Figure 8:
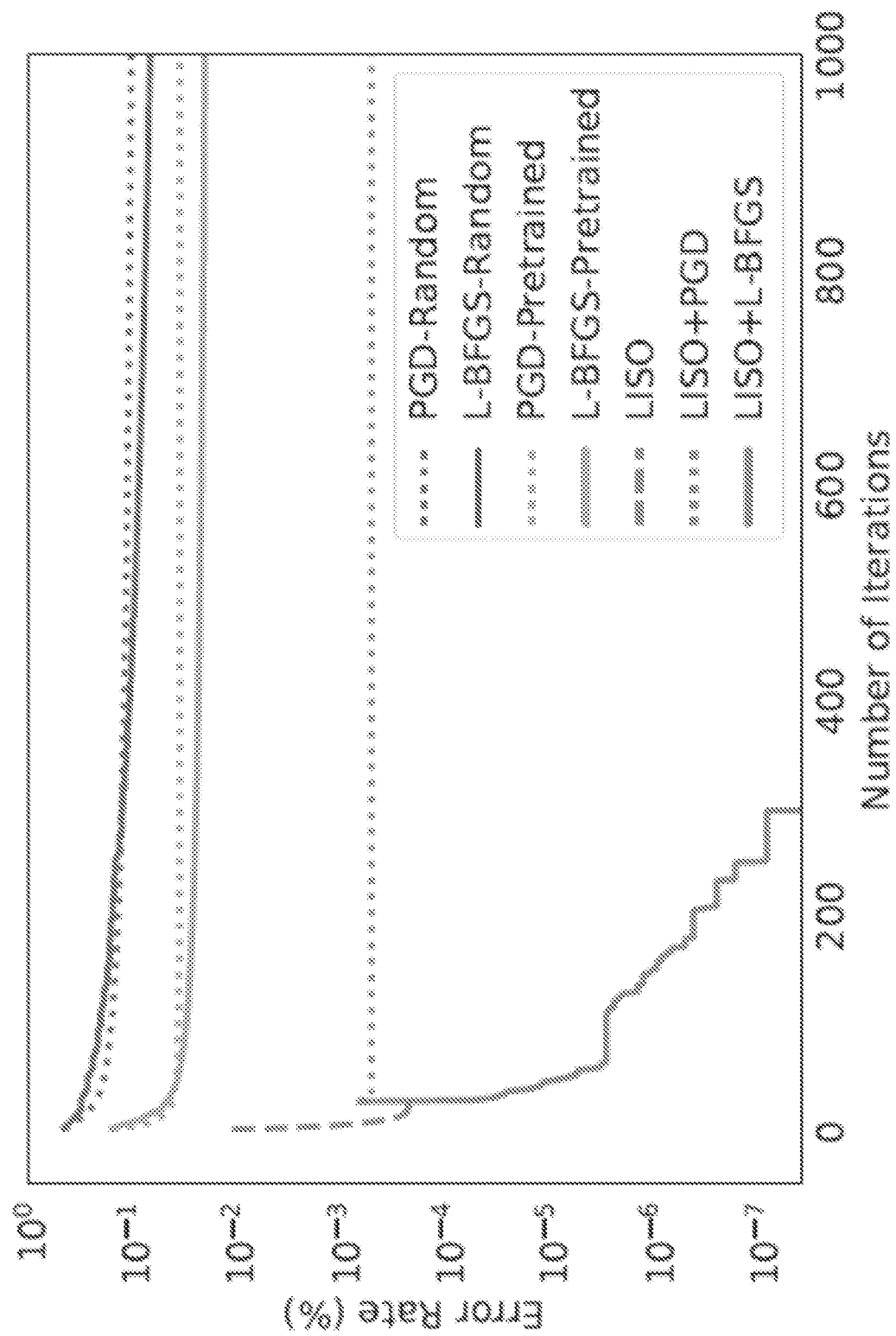

FIGS. 7 and 8 compare the performance of three example LISO embodiments, including LISO, LISO+PGD and LISO+L-BFGS, to both randomly-initiated and pretrained versions of conventional gradient-based optimization methods PGD and L-BFGS, on the same image steganography encoding task at 4 bpp. The pretrained networks are trained using the conventional SteganoGAN approach. These figures more particularly show respective loss and error rate performance as a function of number of iterations.

It is apparent from the plots in FIGS. 7 and 8 that the LISO embodiments disclosed herein converge much faster than the other optimization methods, illustrating that the LISO embodiments can learn a descent direction that is better than the one found by conventional gradient-based optimization methods. LISO converges to 100× lower loss and 80× lower error rate than the other optimization methods. Furthermore, in the case of the LISO+L-BFGS embodiment, loss and error rate can be further reduced by using only a few additional L-BFGS direct optimization steps. This suggests that LISO encoder output is quite close to the optimum and provides a very good initialization for subsequent utilization of conventional gradient-based optimization methods like PGD or L-BFGS.

Illustrative embodiments disclosed herein can be made highly resistant to steganalysis. Avoiding detection of steganographic images is important for many image steganography applications. To investigate the robustness of LISO embodiments disclosed herein against statistical detection techniques, steganographic images generated by the LISO embodiments were processed using StegExpose, a tool devised for steganography detection using four well-known steganalysis approaches—Sample Pairs, RS Analysis, Chi Squared Attack, and Primary Sets, and SiaSteg, a more powerful neural method of steganography detection. Table 4 below shows the results both with and without the inclusion of an additional loss term from the steganalysis system added to the LISO optimization.

TABLE 4

Steganalysis Results

| | Error Rate (%) ↓ | | | | PSNR ↑ | | | | Detection Rate (%) ↓ | | | | | | | |
| --- | --- | --- | --- | --- | --- | --- | --- | --- | --- | --- | --- | --- | --- | --- | --- | --- |
| | | | | | | | | | StegExpose | | | | SiaSteg | | | |
| Method | 1 bit | 2 bits | 3 bits | 4 bits | 1 bit | 2 bits | 3 bits | 4 bits | 1 bit | 2 bits | 3 bits | 4 bits | 1 bit | 2 bits | 3 bits | 4 bits |
| w/o Detection Loss | 2E-05 | 4E-04 | 2E-03 | 3E-02 | 31.99 | 33.29 | 30.16 | 27.45 | 23 | 20 | 26 | 30 | 93 | 95 | 97 | 99 |
| w/Detection Loss | 2E-03 | 3E-03 | 3E-03 | 3E-02 | 31.57 | 32.00 | 29.43 | 27.23 | 22 | 26 | 26 | 32 | 9 | 1 | 11 | 5 |

It is apparent from Table 4 that LISO embodiments have very low detection rates for both StegExpose and SiaSteg steganalysis systems when the additional loss term from the steganalysis system is added to the LISO optimization. Even with the additional loss term, steganographic images generated using conventional SteganoGAN were detected with 100% accuracy by the SiaSteg steganalysis system.

Some embodiments disclosed herein are resistant to various types of compression, such as JPEG compression, as well as additional or alternative format constraints. JPEG is a commonly used lossy compression method, which removes high frequency components from an image and only retains low frequency components of the image, thereby reducing the image size. Steganography that is resistant to JPEG compression is hard to carry out because steganography and JPEG compression have opposing objectives, in that steganography is attempting to encode information through small imperceptible changes and JPEG compression is attempting to eliminate irrelevant small details.

General purpose steganography methods have about a 50% error rate if the steganographic image is JPEG compressed. Many methods have been specifically developed to perform JPEG resistant steganography. Some of these methods find perturbations specifically in low frequency space, such that the changes are not removed by compression. FNNS and LISO embodiments as disclosed herein can include one or more differentiable JPEG layers to approximate compression as part of their training in their steganography methods. For example, some LISO embodiments are configured to include a JPEG layer where a forward pass performs normal JPEG compression and a backwards pass is just an identity function. This embodiment is referred to as LISO-JPEG, and its performance results in hiding 1 bpp of information are shown in Table 5 below. Conventional approaches for JPEG resistant steganography can typically hide no more than 0.5 bpp of information. Some FNNS embodiments can hide 1 bpp of information but exhibit a high error rate of 32%.

TABLE 5

LISO Results with Format Constraints

| Format | Error Rate (%) ↓ | PSNR ↑ |
|---|---|---|
| No limit | 1E–04 | 33.01 |
| PNG | 2E–05 | 31.99 |
| JPEG | 6E–02 | 19.72 |

In the example LISO embodiment for which performance results are shown in Table 5, the training allowed the encoder to find perturbations that are robust to JPEG compression such that the resulting error rate is quite low. The image quality, as shown by the PSNR, is not very high. However, there is a trade-off between message recovery error and image quality in this embodiment, in that higher quality steganographic images can be obtained by training a LISO model with a higher weight on the qualitative loss $L_{qua}$, but this will cause a slight increase in the error rate. Similar results are achieved for other image compression formats, such as PNG (e.g., PNG-24).

Some LISO embodiments as disclosed herein exhibit substantially faster inferencing performance than conventional optimization methods. Table 6 below compares the average inference times in seconds for FNNS-R, FLANS-D, LISO and LISO+L-BFGS embodiments to conventional SteganoGAN. The * notation in the table indicates that the optimization was stopped after zero encoding error was reached.

TABLE 6

| Inference Time Performance | | | | |
|---|---|---|---|---|
| Method | 1 bit | 2 bits | 3 bits | 4 bits |
| SteganoGAN | 0.09 | 0.09 | 0.08 | 0.09 |
| FNNS-R | 42.18 | 114.44 | 156.91 | 159.19 |
| FNNS-D | 4.95* | 10.53* | 44.39 | 44.29 |
| LISO | 0.16 | 0.29 | 0.32 | 0.33 |
| LISO + LBFGS | 1.26* | 2.81* | 6.64* | 28.59 |

As can be seen from the above table, the fastest method is SteganoGAN because that approach utilizes only single forward passes. The FNNS variants on the other hand are much slower. The LISO embodiments are slightly slower than SteganoGAN, but as indicated elsewhere herein the LISO embodiments can achieve much lower error rates with more hidden information than SteganoGAN. The reported times in this table were the average inference times obtained for the validation images of the Div2k dataset with the corresponding methods running on an Nvidia Titan RTX GPU processing device.

The above-described image steganography techniques are presented by way of illustrative example only, and can be varied in other embodiments. Such techniques are widely applicable to numerous image steganography applications.

For example, the disclosed image steganography techniques provide significant advantages in identity protecting image sharing, as will now be described in more detail with reference to the illustrative embodiments of FIGS. 9 and 10.

Increasingly powerful facial recognition systems pose a threat to personal privacy. For example, there are many scenarios in which it is desirable to protect the identities of particular individuals depicted in images. Such scenarios may involve, for example, images taken at a party or a protest. Current approaches to anonymizing faces in images exhibit a number of significant drawbacks. For example, such approaches typically do not provide a secure mechanism for recovering the original face, or cannot guarantee that information about the original face will not be leaked from a perturbed image.

Illustrative embodiments disclosed herein provide techniques for identity protecting image sharing that overcome the above-noted drawbacks of conventional approaches.

For example, some embodiments disclosed herein provide users of social media, messaging services, or other Internet platforms with a safe and secure mechanism by which to share images. This mechanism advantageously protects such users against the dangers that compromising images may "go viral" or leak to online platforms with potentially damaging consequences to particular individuals shown in the images.

In one or more embodiments, an altered image is generated, in which the original face is replaced with a "fake" face and the original face is encrypted and hidden within the altered image, using a steganographic encoder-decoder neural network as previously described in conjunction with FIGS. 1 through 8. The disclosed techniques are illustratively configured to allow a trusted individual or other trusted entity to extract the original face, decrypt it and insert it back into the altered image to obtain the private image. The fake face is generated without any knowledge of the original face, and therefore cannot possibly be used to reconstruct the original face information. Numerous other arrangements for identity protecting image sharing can be used in other embodiments.

A method performed by at least one processing device in an illustrative embodiment comprises detecting a face in an image, modifying the image to replace the detected face with a replacement face, and inserting an encrypted version of the detected face into the modified image. The method in some embodiments further comprises extracting the encrypted version of the detected face from the modified image, obtaining a decryption key for the encrypted version of the detected face, decrypting the encrypted version of the detected face using the obtained decryption key to recover the detected face, and restoring the image by replacing the replacement face of the modified image with the detected face.

Some embodiments disclosed herein provide a mechanism to allow a person A to share an image with person B that contains sensitive information (e.g., A's face, which would reveal her identity) in a way such that if the image is leaked to a third party the sensitive information is obfuscated and inaccessible.

As indicated previously, these and other embodiments disclosed herein advantageously provide users of social media, messaging services, or other Internet platforms with a safe and secure mechanism by which to share images. This mechanism protects such users against the dangers that compromising images may "go viral" or leak to online platforms with potentially damaging consequences to the individuals shown in the images.

In an illustrative embodiment, two versions of an image are created: Version X that contains the sensitive information (accessible to A, but also accessible to B by A providing B with an appropriate decryption key) and version X' with the sensitive information removed and filled in with other plausible (e.g., benign) natural-looking content. If the image is viewed using standard image rendering software (e.g., a browser, Apple preview), version X' will be visible. With software configured as disclosed herein (e.g., a browser plugin) and the appropriate decryption key, version X can be restored.

For example, the facial features of A in her image would be removed and filled in with an artificially-generated face of a fictitious person. The filled in (fake) details appear to be plausible to most viewers.

The image is viewable by anybody who does not have access to the key. This is a crucial aspect, as the identity of a non-famous person often is irrelevant to most viewers in a viral image but very damning to that person.

As indicated above, there is also a mechanism for trusted parties to retrieve the original images.

If the sensitive portion of the image is encoded as a GAN latent code, then a variant of the mechanism used in some embodiments can ensure that any attempted decryption with an incorrect key also results in a viable GAN latent code. For example, if the sensitive portion is a face, a brute-force decryption attack could involve trying out millions of keys until a face emerges from the decryption (which could be recognized automatically by face detection software). In such embodiments, every decryption made using an incorrect key would result in a face, rendering any brute force decryption attack impractical.

Illustrative embodiments disclosed herein can be implemented, for example, in social media platforms, chat services, mobile devices, and/or browser plugins.

In some embodiments, an example method includes a sharing part and a viewing part, illustratively arranged as follows.

In the sharing part, at least one sensitive region is identified (e.g., using automatic face detection, or manual specification by the user). The region is removed and filled in through image inpainting (e.g., using GANs, image quilting or other techniques). The removed part is encrypted (e.g., using PGP, GPG, Blowfish, Twofish, AES or other encryption algorithms) and hidden in the image (e.g., as metadata or using steganography). One possible variant is to generate a latent key, which can be used to restore the secret portion of the image with a neural network generator (e.g., a GAN).

In the viewing part, the non-sensitive (artificially generated) version can be viewed with any image viewer. An intended recipient, in possession of the decryption key, can decrypt the secret message in the image and recover and restore the sensitive portion. If the secret was stored in form of a latent code, the code needs to be passed through a GAN to restore the sensitive image portion.

Potential alternatives include encrypting the entire original image, and/or masking out multiple sensitive portions of an image.

Illustrative embodiments can be used to create "family friendly" social networks, or to protect teenagers from the fallouts of data leakage and unwanted distribution of identifying images. These and other embodiments advantageously protect sensitive images from unintended parties (e.g., future employers, governments, etc.)

Some embodiments modify existing social networks such as those provided by Facebook, Google and SnapChat, to implement the disclosed identity protecting image sharing techniques.

These and other embodiments provide individuals (e.g., teenagers) with a safe mechanism to share pictures with their friends online and reducing the chance that these pictures can later hurt them in their lives (e.g., as future employers reverse image-search an applicant, or politicians face public scrutiny for pictures for when they were young, or private pictures are leaked and posted online).

Another example embodiment operates in the following manner. Assume that a first user, Alice, wants to send a picture of herself to a second user, Bob. This embodiment illustratively used public key cryptography, but it is to be appreciated that a wide variety of other cryptographic techniques can be used.

First, Alice's face in the image is detected, cut-out, and replaced with a realistic-looking, randomly-generated face that conceals her identity. Her original face is encrypted (e.g., with Bob's public key) and hidden as a secret message in the rest of the image.

If Bob receives the message, his private key can counter the public key encryption, Alice's face is restored and pasted back into the image, so Bob sees the original image.

If Eve (who is not an intended recipient) receives the image, her computer cannot decrypt the secret image and it displays the standard image with the randomly generated face. In fact, she would not even know a secret message is hidden in it. So if she posts the image online, no external viewer (except Bob) would be able to recognize Alice.

In these and other embodiments, a GAN may be trained to generate realistic looking images from a random 512 byte code (e.g., style-GAN https://github.com/NVlabs/stylegan).

Image inpainting is illustratively performed by cutting out Alice's face from the image and solving the inverse problem to generate a face that matches the contour of Alice's head, without optimizing at all for her face.

The GAN can also be used to solve the inverse problem to obtain a code which, if used by the GAN, reconstructs her face. If this code is stored in the image, instead of the actual pixels, every decryption with an incorrect key would also generate a plausible face. This would prevent a possible brute-force attack by a powerful adversary (e.g., a government) to identify who is hidden in the image, as every decryption key they try would result in a face and a machine could not identify which face is the correct one.

Examples of illustrative embodiments will now be described in detail with reference to FIGS. 9 and 10. These illustrative embodiments are configured to provide identity protecting image sharing in example contexts and use cases, but the disclosed techniques can be adapted in a straightforward manner to other contexts and use cases.

Figure 9:
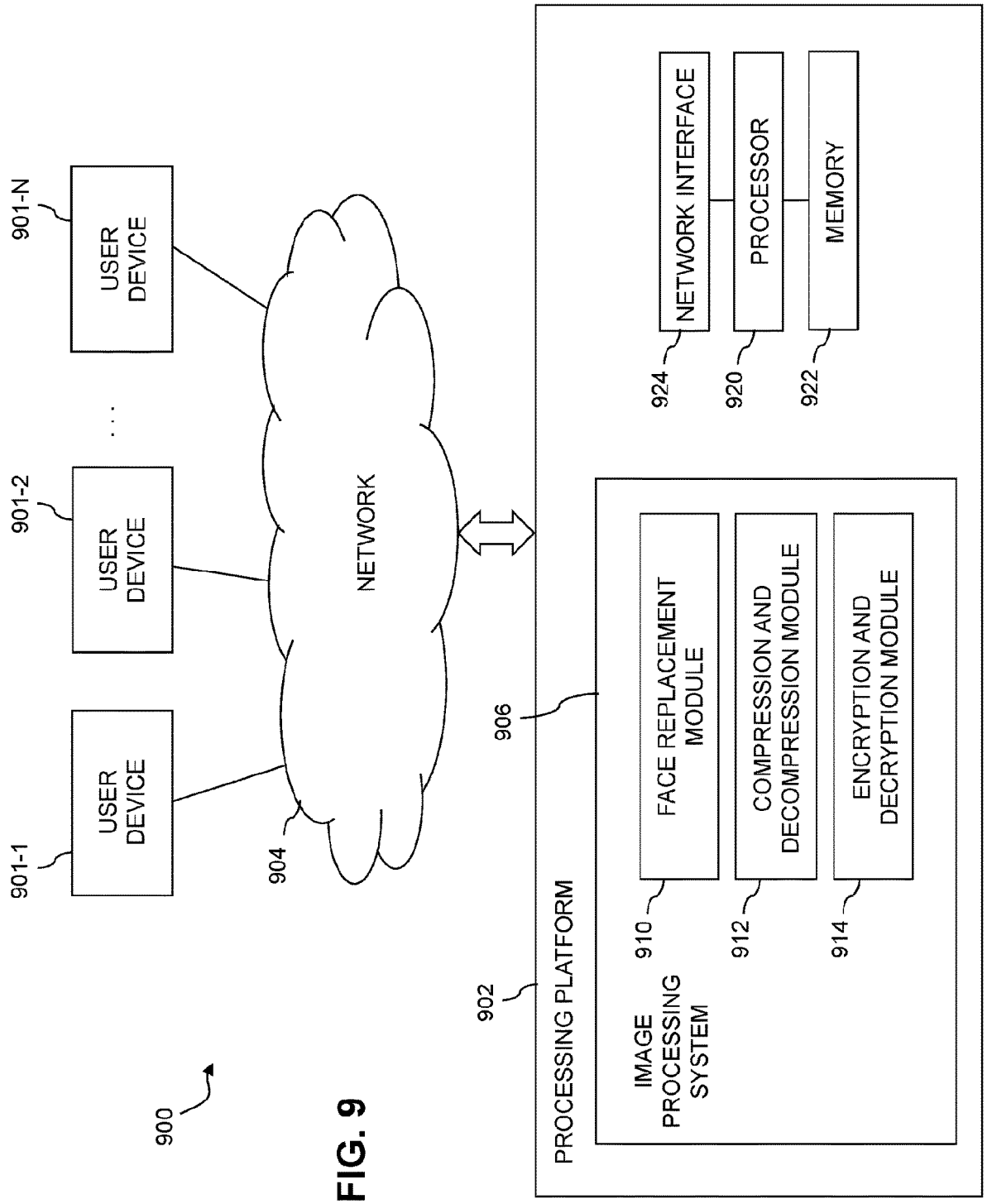
FIG. 9 is a block diagram of an information processing system configured to implement functionality for identity protecting image sharing in an illustrative embodiment.

FIG. 9 shows an information processing system 900 implementing identity protecting image sharing in an illustrative embodiment. The system 900 comprises a plurality of user devices 901-1, 901-2, . . . 901-N that communicate with a processing platform 902 over a network 904. The processing platform 902, which is illustratively implemented as one or more processing devices, comprises an image processing system 906 that includes a face replacement module 910, a compression and decompression module 912, and an encryption and decryption module 914, although other types and arrangements of processing modules can be used.

The user devices 901 illustratively comprise laptop computers, tablet computers, desktop computers, mobile telephones, or other types of computers or communication devices, in any combination. Such user devices 901 are considered examples of "processing devices" as that term is broadly used herein.

The processing platform 902 illustratively comprises one or more computers, servers or other processing devices. Although shown as separate from the user devices 901 in this embodiment, the processing platform 902 can itself be another user device, or a more complex arrangement of processing devices, as in an enterprise-based or cloud-based social media platform or other type of data center.

The network 904 can comprise, for example, a global computer network such as the Internet, a wide area network (WAN), a local area network (LAN), a satellite network, a telephone or cable network, a cellular network such as a 4G or 5G network, a wireless network implemented using a wireless protocol such as Bluetooth, WiFi or WiMAX, or various portions or combinations of these and other types of communication networks.

In operation, the image processing system 906 of processing platform 902 is illustratively configured to detect a face in an image, to modify the image to replace the detected face with a replacement face, and to insert an encrypted version of the detected face into the modified image. The image that contains the detected face is also referred to herein as an "original" image, and that term is intended to be broadly construed to encompass any image to which the above-noted image processing operations are applied.

Image steganography techniques of the type described elsewhere herein are illustratively used to insert the encrypted version of the detected face into the modified image. Accordingly, the processing platform 902 in some embodiments implements a steganographic encoder-decoder neural network, such as the steganographic encoder-decoder neural network 102 of FIG. 1. Such an encoder-decoder neural network can be implemented within or otherwise in conjunction with the face replacement module 910.

As indicated above, in some embodiments the processing platform 902 comprises another instance of a user device, similar to user devices 901, while in other embodiments the processing platform 902 comprises a social media processing platform accessible to user devices 901 over network 904. Numerous other arrangements of one or more processing devices can be used to implement image processing system 906.

In some embodiments, inserting the encrypted version of the detected face into the modified image comprises extracting pixel information of the detected face from the image, encoding the pixel information, encrypting the encoded pixel information, and inserting the encrypted encoded pixel information into the modified image.

Encoding the pixel information in such an embodiment illustratively comprises compressing the pixel information and/or encoding the pixel information using a latent code of a GAN.

In some embodiments, inserting the encrypted encoded pixel information into the modified image comprises distributing the encrypted encoded pixel information across a plurality of pixels of the modified image. Other arrangements are possible, such as, for example, inserting the encrypted encoded pixel information as image metadata.

The image processing system 906 in some embodiments is further configured to recover the original image using a decryption key. This illustratively involves extracting the encrypted version of the detected face from the modified image, obtaining a decryption key for the encrypted version of the detected face, decrypting the encrypted version of the detected face using the obtained decryption key to recover the detected face, and restoring the image by replacing the replacement face of the modified image with the detected face.

In some embodiments, the replacement face incorporates at least a portion of the encrypted version of the detected face.

For example, in some embodiments, modifying the image to replace the detected face with a replacement face and inserting the encrypted version of the detected face into the modified image collectively comprise applying a masked version of the image and the encrypted version of the detected face to an encoder of a neural network, and generating the modified image in the encoder of the neural network to include the replacement face and the encrypted version of the detected face.

The encrypted version of the detected face in such an embodiment is recoverable from the modified image by applying the modified image to a decoder of the neural network to generate the encrypted version of the detected face from the modified image.

Additional or alternative operations can be used in other embodiments to generate a modified image from an original image, and to recover the original image from the modified image using a decryption key.

Although the image processing system 906 is shown as being implemented on a single processing platform 902 in the present embodiment, this is by way of illustrative example only. In other embodiments, the various modules 910, 912 and 914 of the image processing system 906, or portions of one or more such modules, can each be implemented on a separate processing platform, or using other arrangements. A given such processing platform is assumed to include at least one processing device comprising a processor coupled to a memory. Examples of such processing devices include computers, servers or other processing devices arranged to communicate over a network.

The processing platform 902 in the present embodiment further comprises a processor 920, a memory 922 and a network interface 924. The processor 920 is assumed to be operatively coupled to the memory 922 and to the network interface 924 as illustrated by the interconnections shown in the figure.

The processor 920 may comprise, for example, a microprocessor, an application-specific integrated circuit (ASIC), a field-programmable gate array (FPGA), a central processing unit (CPU), a tensor processing unit (TPU), a graphics processing unit (GPU), an arithmetic logic unit (ALU), a digital signal processor (DSP), or other similar processing device component, as well as other types and arrangements of processing circuitry, in any combination. At least a portion of the functionality of an image processing system and its associated modules, neural networks and/or other components provided by one or more processing devices as disclosed herein can be implemented using such circuitry.

In some embodiments, the processor 920 comprises one or more graphics processor integrated circuits. Such graphics processor integrated circuits are illustratively implemented in the form of one or more GPUs. Accordingly, in some embodiments, system 900 is configured to include a GPU-based processing platform. Such a GPU-based processing platform can be cloud-based configured to implement neural networks or other portions of one or more image processing systems as disclosed herein. Other embodiments can be implemented using similar arrangements of one or more TPUs.

Numerous other arrangements are possible. For example, in some embodiments, an image processing system and any associated neural networks can be implemented on a single processor-based device, such as a smartphone, client computer or other user device, utilizing one or more processors of that device. Such embodiments are examples of user device based implementations of an image processing system The memory 922 stores software program code for execution by the processor 920 in implementing portions of the functionality of the processing platform 902. For example, at least portions of the functionality of face replacement module 910, compression and decompression module 912 and/or encryption and decryption module 914 can be implemented using program code stored in memory 922.

A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, flash memory, read-only memory (ROM), magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, illustrative embodiments may be implemented in the form of integrated circuits comprising processing circuitry configured to implement processing operations associated with the image processing system 906 as well as other related functionality. For example, at least portions of the image processing system 906, such as one or more neural networks thereof, can be illustratively implemented in at least one neural network integrated circuit of a processing device of the processing platform 902.

The network interface 924 is configured to allow the processing platform 902 to communicate over one or more networks with other system elements, and may comprise one or more conventional transceivers.

It is to be appreciated that the particular arrangement of components and other system elements shown in FIG. 9 is presented by way of illustrative example only, and numerous alternative embodiments are possible. For example, other embodiments of information processing systems can be configured to implement image processing functionality of the type disclosed herein.

Another example of an image processing application that can be implemented in image processing system 906 of processing platform 902 provides users with privacy guarantees for their images that are uploaded to social media platforms, messaging services, or other Internet platforms. Such an application need not utilize face detection and replacement as previously described, but instead focuses on images in general.

For example, a user can upload a steganographic image generated from a benign cover image (e.g., an image of a random cat) to a social media platform (e.g., Facebook or Instagram), where the secret message hidden in the steganographic image comprises a message image (e.g., an image of the user's children playing outside) that the user does not want everyone to see. Only those users with the appropriate permissions can extract the secret message from the steganographic image to obtain the message image (e.g., can see the image of the children playing outside instead of just the image of the cat).

Such an application does not require detection or replacement of faces, and therefore can provide privacy protections using images that do not include any faces at all. For example, a user could hide an image of his or her social security card in a benign cover image, and provide only one or more authorized users with the appropriate permissions to view that hidden message image, while all other users would see only the benign cover image, and would be unable to extract the hidden message image.

Figure 10:
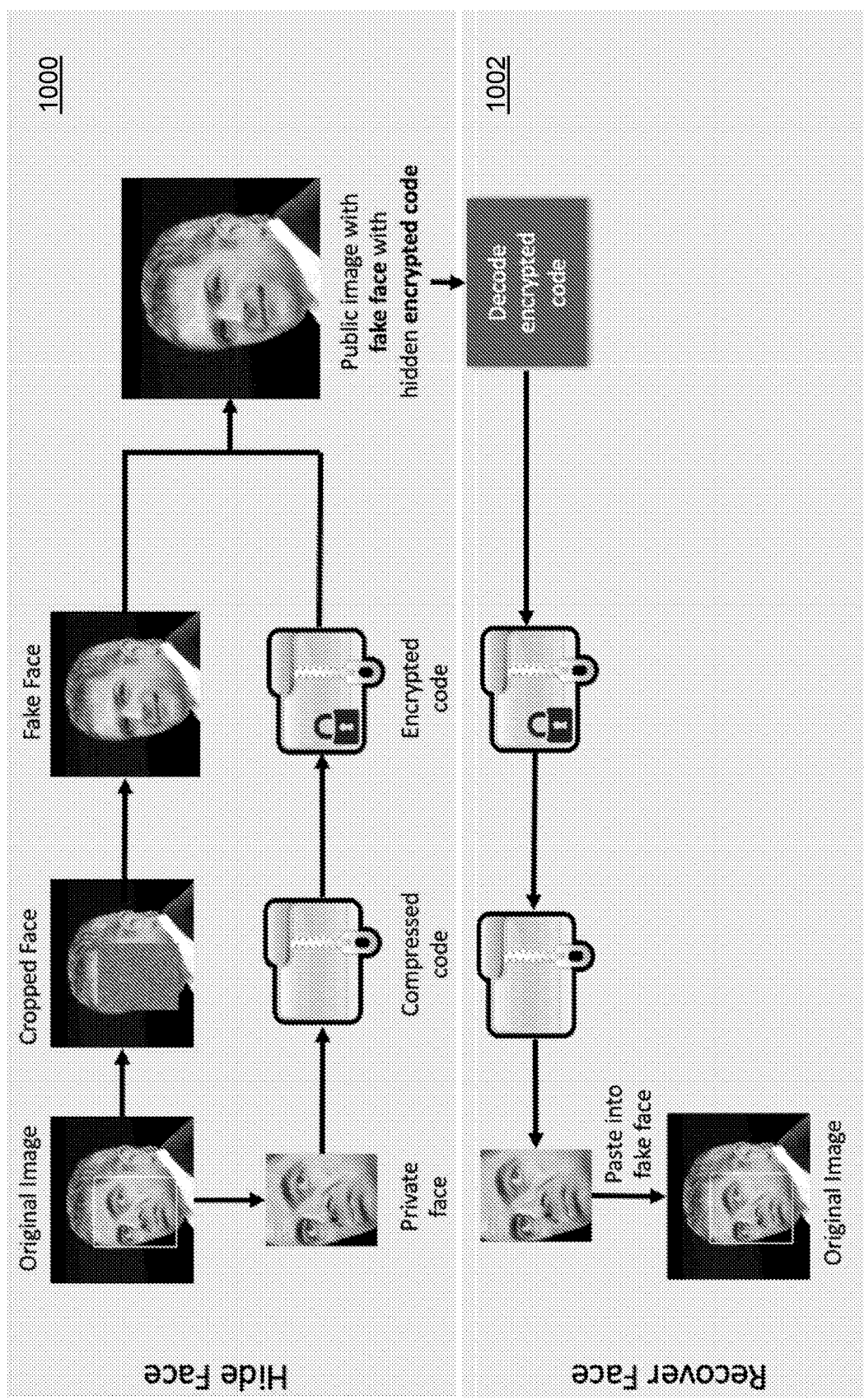
FIG. 10 shows an example process for identity protecting image sharing in an illustrative embodiment.

FIG. 10 illustrates an example of one possible implementation of an identity protecting image sharing process implemented by image processing system 906 in an illustrative embodiment.

In this embodiment, an identity protecting image sharing process comprises a first stage 1000 in which a face detected in an original image is replaced by a fake face, and the detected face, also referred to as a "private face," is compressed, encrypted and hidden in the modified original image as an encrypted code. For example, image steganography techniques of the type described elsewhere herein, including FNNS techniques, LISO techniques or other techniques, can be used to incorporate the compressed and encrypted detected face as a secret message into a cover image. The cover image in this embodiment is also referred to as a "public image" in the figure, and includes the fake face as a replacement for the detected face.

A second stage 1002 of the identity protecting image sharing process recovers the detected face by decoding the encrypted code hidden in the public image, and performing complementary encryption and decompression operations relative to those performed in first stage 1000, to recover the detected face. The detected face is then reinserted into the original image in place of the fake face in order to recover the original image.

Again, the particular arrangements shown in FIGS. 1 through 10 are considered illustrative examples only.

In other embodiments, different types of neural networks can be used. For example, some embodiments can be implemented using other types of neural networks than those specifically referred to herein.

Also, the particular process operations described in illustrative embodiments herein, although illustrated as being performed sequentially, can in other embodiments be performed at least in part in parallel with one another, or in different orders. Also, additional or alternative processing operations can be used in other embodiments.

As indicated previously, embodiments disclosed herein provide significant advantages over conventional approaches.

For example, some embodiments provide image steganography techniques that can achieve substantially lower recovered message error rates with more hidden bits per image pixel than conventional techniques.

Illustrative embodiments are applicable to a wide variety of different information security and image processing applications. For example, some embodiments provide users of social media, messaging services, or other Internet platforms with a safe and secure mechanism by which to share images while protecting such users against the dangers that compromising images may "go viral" or leak to online platforms with potentially damaging consequences to the individuals shown in the images.

These and other advantages referred to herein are illustratively present in some embodiments, but need not be present in all embodiments. Other embodiments can provide different arrangements of advantages, depending upon their particular implementations.

The particular configurations as shown in the figures are non-limiting and should be considered illustrative examples only. Numerous other types of system architectures can be used in other embodiments. Also, other types of neural networks can be used in other embodiments. Accordingly, illustrative embodiments herein are not limited to use with encoder-decoder neural networks, GANs or other particular types of neural networks.

Information processing systems disclosed herein, such as system 100, can be configured to support a wide variety of distinct applications, in numerous diverse contexts. For example, as indicated previously, the disclosed techniques are applicable to a wide variety of different social networks and other image processing and communication contexts.

It is therefore to be appreciated that the particular use cases described herein are examples only, intended to demonstrate utility of illustrative embodiments, and should not be viewed as limiting in any way.

As indicated above, the particular arrangements shown and described in conjunction with FIGS. 1 through 10 are presented by way of illustrative example only, and numerous alternative embodiments are possible. The various embodiments disclosed herein should therefore not be construed as limiting in any way. Numerous alternative arrangements of processing devices and image processing systems can be utilized in other embodiments. Those skilled in the art will also recognize that alternative processing operations and associated system configurations can be used in other embodiments.

It is therefore possible that other embodiments may include additional or alternative system elements, relative to the entities of the illustrative embodiments. Accordingly, the particular system configurations and associated algorithm implementations can be varied in other embodiments.

A given processing device or other component of an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, an ASIC, an FPGA, a CPU, a TPU, a GPU, an ALU, a DSP, or other similar processing device component, as well as other types and arrangements of processing circuitry, in any combination. For example, at least a portion of the functionality of at least one image processing system provided by one or more processing devices as disclosed herein can be implemented using such circuitry.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, ROM, flash memory, magnetic memory, optical memory, or other types of storage devices in any combination.

As mentioned previously, articles of manufacture comprising such processor-readable storage media are considered embodiments of the invention. The term "article of manufacture" as used herein should be understood to exclude transitory, propagating signals. Other types of computer program products comprising processor-readable storage media can be implemented in other embodiments.

In addition, embodiments of the invention may be implemented in the form of integrated circuits comprising processing circuitry configured to implement processing operations associated with implementation of at least portions of an image processing system.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. Each processing device of the processing platform is assumed to comprise a processor coupled to a memory. A given such network can illustratively include, for example, a global computer network such as the Internet, a WAN, a LAN, a satellite network, a telephone or cable network, a cellular network such as a 4G or 5G network, a wireless network implemented using a wireless protocol such as Bluetooth, WiFi or WiMAX, or various portions or combinations of these and other types of communication networks.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

A given processing platform implementing an image processing system as disclosed herein can alternatively comprise a single processing device, such as a computer or server. It is also possible in some embodiments that one or more such system elements can run on or be otherwise supported by cloud infrastructure or other types of virtualization infrastructure.

User device implementations of an image processing system as disclosed herein can include software installed in browsers or other image viewing programs of a computer or a mobile telephone.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components of the system as disclosed herein can be implemented at least in part in the form of one or more software programs stored in memory and executed by a processor of a processing device. For example, certain functionality disclosed herein can be implemented at least in part in the form of software.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts.

It should again be emphasized that the embodiments of the invention as described herein are intended to be illustrative only. Other embodiments of the invention can be implemented utilizing a wide variety of different types and arrangements of information processing systems, image processing systems and processing devices than those utilized in the particular illustrative embodiments described herein, and in numerous alternative processing contexts. In addition, the particular assumptions made herein in the context of describing certain embodiments need not apply in other embodiments. These and numerous other alternative embodiments will be readily apparent to those skilled in the art.

What is claimed is:

1. A method comprising:
applying a first image and a message to an encoder of a steganographic encoder-decoder neural network;
generating in the encoder, based at least in part on the first image and the message, a perturbed image containing the message;
decoding the perturbed image in a decoder of the steganographic encoder-decoder neural network;
providing information characterizing the decoded perturbed image to the encoder;
iteratively repeating the generating, decoding and providing, with different perturbations being determined in the encoder as a function of respective different instances of the provided information, until the decoded perturbed image meets one or more specified criteria relative to the message; and
outputting the perturbed image corresponding to the decoded perturbed image that meets the one or more specified criteria relative to the message as a steganographic image containing the message;
wherein the method is performed by at least one processing device comprising a processor coupled to a memory.

2. The method of claim 1 wherein the message comprises a message image.

3. The method of claim 1 wherein the one or more specified criteria relative to the message include that the decoded perturbed image is identical to the message.

4. The method of claim 1 wherein the provided information comprises the decoded perturbed image itself.

5. The method of claim 1 wherein generating the perturbed image containing the message comprises:
determining for a given one of a plurality of iterations a differential image computed between a message image and the decoded perturbed image; and
utilizing the differential image to generate the perturbed image for a subsequent one of the iterations.

6. The method of claim 1 wherein the different perturbations comprise respective adversarial perturbations configured to drive the decoder towards generating a particular output when decoding the corresponding perturbed images.

7. The method of claim 1 wherein the decoder comprises a first fixed network.

8. The method of claim 7 wherein the first fixed network comprises a multi-layer convolutional neural network that includes one or more convolution layers and one or more activation layers.

9. The method of claim 7 wherein the encoder comprises a second fixed network corresponding to the first fixed network of the decoder.

10. The method of claim 9 wherein generating the perturbed image containing the message comprises:
determining for a given one of a plurality of iterations a differential image computed between a message image and the decoded perturbed image; and
applying the differential image to the second fixed network of the encoder to generate the perturbed image for a subsequent one of the iterations.

11. The method of claim 1 wherein generating the perturbed image containing the message comprises:
determining for a given one of a plurality of iterations a loss gradient between a message image and the decoded perturbed image; and
utilizing the loss gradient to generate the perturbed image for a subsequent one of the iterations.

12. The method of claim 11 wherein the iterations are configured to optimize the perturbed image by solving an optimization problem that includes as its objective function a minimization of binary cross entropy (BCE) loss.

13. The method of claim 11 wherein the encoder comprises a recurrent neural network that iteratively optimizes the perturbed image with respect to the loss gradient.

14. The method of claim 13 wherein the recurrent neural network comprises a gated recurrent unit (GRU) having a hidden state.

15. The method of claim 14 wherein the GRU is configured to update its hidden state in each of one or more of the iterations based at least in part on a current perturbation, the loss gradient and the first image.

16. The method of claim 1 further comprising:
    detecting a face in an original image;
    generating the first image from the original image by modifying the original image to replace the detected face with a replacement face; and
    generating the message to comprise an encrypted version of the detected face.

17. The method of claim 16 wherein generating the message to comprise an encrypted version of the detected face comprises:
    extracting pixel information of the detected face from the original image;
    encoding the pixel information; and
    encrypting the encoded pixel information to form at least a portion of the message.

18. The method of claim 17 wherein encoding the pixel information comprises at least one of compressing the pixel information and encoding the pixel information using a latent code of a generative adversarial network (GAN).

19. The method of claim 16 further comprising:
    extracting the message from the steganographic image to obtain the first image;
    obtaining the encrypted version of the detected face from the message;
    obtaining a decryption key for the encrypted version of the detected face;
    decrypting the encrypted version of the detected face using the obtained decryption key to recover the detected face; and
    restoring the original image by replacing the replacement face of the first image with the detected face.

20. The method of claim 1 wherein an iterative optimization process performed by the encoder in generating the different perturbations comprises a first phase implementing a first type of optimization and a second phase implementing a second type of optimization different than the first type of optimization.

21. The method of claim 20 wherein the first type of optimization comprises a learned iterative optimization and the second type of optimization comprises a non-learned iterative optimization, and wherein a perturbed image generated using the learned iterative optimization is provided as an initial input to the non-learned iterative optimization.

22. The method of claim 1 wherein an iterative optimization process performed by the encoder in generating the different perturbations utilizes at least one loss term that is derived from at least one corresponding steganalysis system so as to thereby decrease a likelihood that the steganographic image containing the message can be identified as a steganographic image by said at least one steganalysis system.

23. The method of claim 1 wherein the encoder comprises at least one image compression layer implementing a forward pass that performs image compression and a backwards pass comprising an identity function.

24. The method of claim 23 wherein the image compression layer comprises a JPEG layer.

25. A system comprising:
    at least one processing device comprising a processor coupled to a memory;
    the processing device being configured:
    to apply a first image and a message to an encoder of a steganographic encoder-decoder neural network;
    to generate in the encoder, based at least in part on the first image and the message, a perturbed image containing the message;
    to decode the perturbed image in a decoder of the steganographic encoder-decoder neural network;
    to provide information characterizing the decoded perturbed image to the encoder;
    to iteratively repeat the generating, decoding and providing, with different perturbations being determined in the encoder as a function of respective different instances of the provided information, until the decoded perturbed image meets one or more specified criteria relative to the message; and
    to output the perturbed image corresponding to the decoded perturbed image that meets the one or more specified criteria relative to the message as a steganographic image containing the message.

26. The system of claim 25 wherein the one or more specified criteria relative to the message include that the decoded perturbed image is identical to the message.

27. The system of claim 25 wherein the different perturbations comprise respective adversarial perturbations configured to drive the decoder towards generating a particular output when decoding the corresponding perturbed images.

28. A computer program product comprising a non-transitory processor-readable storage medium having stored therein program code of one or more software programs, wherein the program code, when executed by at least one processing device comprising a processor coupled to a memory, causes the at least one processing device:
    to apply a first image and a message to an encoder of a steganographic encoder-decoder neural network;
    to generate in the encoder, based at least in part on the first image and the message, a perturbed image containing the message;
    to decode the perturbed image in a decoder of the steganographic encoder-decoder neural network;
    to provide information characterizing the decoded perturbed image to the encoder;
    to iteratively repeat the generating, decoding and providing, with different perturbations being determined in the encoder as a function of respective different instances of the provided information, until the decoded perturbed image meets one or more specified criteria relative to the message; and
    to output the perturbed image corresponding to the decoded perturbed image that meets the one or more specified criteria relative to the message as a steganographic image containing the message.

29. The computer program product of claim 28 wherein the one or more specified criteria relative to the message include that the decoded perturbed image is identical to the message.

30. The computer program product of claim 28 wherein the different perturbations comprise respective adversarial perturbations configured to drive the decoder towards generating a particular output when decoding the corresponding perturbed images.

* * * * *